(12) United States Patent
Orebaugh et al.

(10) Patent No.: US 12,462,708 B2
(45) Date of Patent: Nov. 4, 2025

(54) TRAINING SIMULATOR FOR DIRECT LARYNGOSCOPY

(71) Applicant: University of Pittsburgh—Of the Commonwealth System of Higher Education, Pittsburgh, PA (US)

(72) Inventors: Steven L. Orebaugh, Pittsburgh, PA (US); James V. Snyder, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 83 days.

(21) Appl. No.: 18/565,421

(22) PCT Filed: Aug. 31, 2022

(86) PCT No.: PCT/US2022/042233
§ 371 (c)(1),
(2) Date: Nov. 29, 2023

(87) PCT Pub. No.: WO2023/034433
PCT Pub. Date: Mar. 9, 2023

(65) Prior Publication Data
US 2024/0257665 A1 Aug. 1, 2024

Related U.S. Application Data

(60) Provisional application No. 63/239,299, filed on Aug. 31, 2021.

(51) Int. Cl.
*G09B 23/28* (2006.01)
*G09B 23/32* (2006.01)
*G09B 23/34* (2006.01)

(52) U.S. Cl.
CPC .......... *G09B 23/285* (2013.01); *G09B 23/32* (2013.01); *G09B 23/34* (2013.01)

(58) Field of Classification Search
CPC ....... G09B 23/285; G09B 23/32; G09B 23/34
See application file for complete search history.

(56) References Cited

U.S. PATENT DOCUMENTS

2011/0155142 A1* 6/2011 Boucher ................. A61F 5/566
128/848
2017/0345341 A1 11/2017 Sakezles
(Continued)

OTHER PUBLICATIONS

International Search Report and Written Opinion for PCT/US2022/042233, mailed Nov. 30, 2022.

*Primary Examiner* — Robert P Bullington
(74) *Attorney, Agent, or Firm* — Klarquist Sparkman, LLP

(57) ABSTRACT

Described are examples of a training simulator for direct laryngoscopy, which reproduce the dynamics of the human airway and hyoid bone movement observed in the human anatomy during movement of the somatic skeleton and direct laryngoscopy procedures. Training simulators can include a skeleton structure having a styloid process analogue, a mandible analogue, and a longitudinally extending column configured to move between an extended state and a flexed state. A suspension chain can extend parallel to the column and be configured to move with the column. The suspension chain can include a hyoid analogue coupled to the styloid process analogue, the mandible analogue, and an anchor point situated along the column of the skeleton structure. Training simulators can also include a glottis analogue, the visibility of which can be greater when the column is in a flexed state, than when the column is in an extended state.

25 Claims, 13 Drawing Sheets

(56) References Cited

U.S. PATENT DOCUMENTS

2019/0019434 A1    1/2019  Hastings et al.
2023/0136935 A1*  5/2023  Clifton, III ............ G09B 23/30
                                                        434/267

* cited by examiner

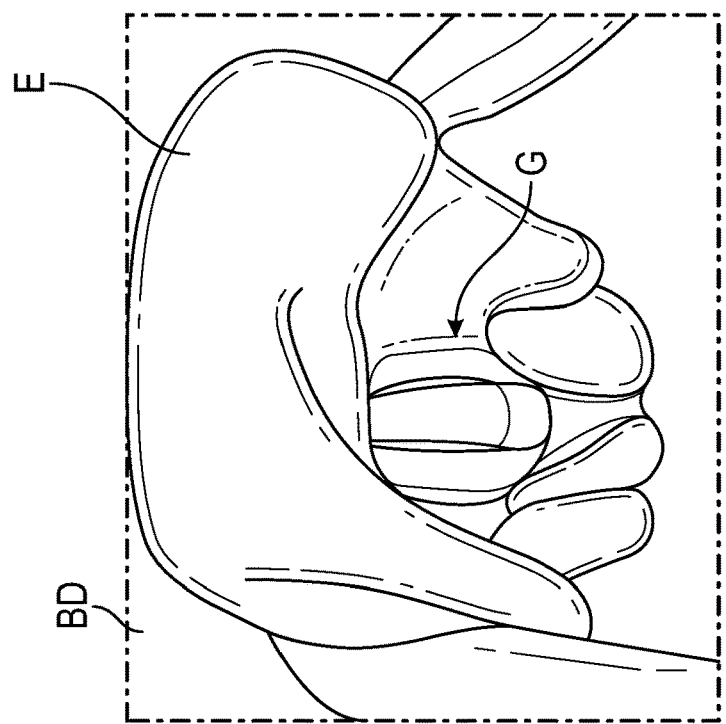
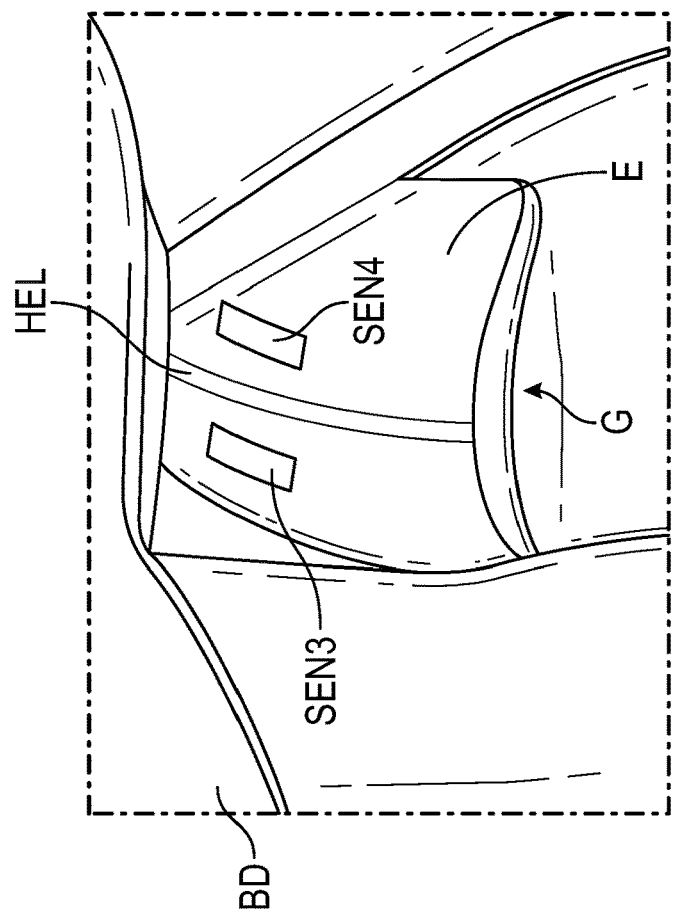
FIG. 14B
FIG. 14A

TRAINING SIMULATOR FOR DIRECT LARYNGOSCOPY

CROSS REFERENCE TO RELATED APPLICATIONS

This is the U.S. National Stage of International Application No. PCT/US2022/042233, filed Aug. 31, 2022, which was published in English under PCT Article 21(2), which in turn claims the benefit of U.S. Provisional Application No. 63/239,299, filed Aug. 9, 2021. The provisional application is incorporated herein in its entirety.

FIELD

This application relates to medical training equipment, specifically a training simulator for laryngoscopy.

BACKGROUND

Currently, there is resistance in medical training to direct laryngoscopy techniques which promote the use of head elevation to ease glottis exposure. This resistance can be attributed to the wide acceptance of the more conventional "tip-the-head-back" approach and the lack of opportunities for medical practitioners to employ and observe the benefits of head elevation. One reason for this is that anatomic simulators which could be used to demonstrate the utility of the head elevation do not exist. Conventional airway simulators lack realism in both their materials and the construction. In particular, existing simulators fail to recreate the mechanical dynamics representative of how the human airway relates and interacts with other anatomical structures, especially the axial skeleton (e.g., the human skull and spine). In the body, for example, these other anatomical structures interact with the airway and can guide, resist, or constrain epiglottis exposure (i.e., the airway opening) during laryngoscopy procedures.

The anatomical elements within existing simulators are typically molded into a single structure, and therefore do not adequately simulate the dynamic interactions between individual anatomical elements, or the airway in relation to a somatic skeleton. Rather, existing simulators resemble the human airway only superficially. Thus, existing simulators cannot react in a realistic manner to the forces applied by a laryngoscope blade within the airway during flexion or extension of the somatic skeleton. Accordingly, improved airway simulators are needed.

SUMMARY

Described herein are examples of a training simulator for direct laryngoscopy, which reproduces the movement and dynamics of the human airway. Specifically, examples of the training simulator of the present disclosure are operable to accurately reproduce hyoid bone movement observed in the human anatomy during movement of the somatic skeleton and in response to direct laryngoscopy procedures, neither of which existing conventional training mannequins are able to achieve.

In one aspect, a laryngoscopy training simulator is provided. The laryngoscopy training simulator can comprise a somatic skeleton and an airway skeleton. The somatic skeleton can comprise a skull portion and a spine portion coupled to the skull portion, the skull portion having a styloid process and a mandible, and the spine portion having a plurality of vertebra arranged in a column. The skull portion and the spine portion can be configured to curve between an extended position and a flexed position. The airway skeleton can comprise a hyoid bone, a first ligament coupling the hyoid bone to the styloid process of the skull portion, and a second ligament coupling the hyoid bone to the mandible of the skull portion. When the skull and spine portions are in the extended position, the first ligament is under tension and draws the hyoid bone in a first direction and when the skull and spine portions are in the flexed position, the second ligament is under tension and draws the hyoid bone in a second direction. The training simulator is configured to simulate hyoid bone movement relative to the spine and skull portions in a similar manner as the human anatomy.

In some examples, a ligament assembly can couple the hyoid bone to an anchor point of the spine portion, wherein the styloid process is coupled to a first end of the spine portion and the anchor point is located at a second end of the spine portion opposite the styloid process. In some examples, the first ligament and the ligament assembly can be tensioned between the styloid process and the anchor point when the skull and spine portions are in the extended position. In some examples, the first ligament can be tensioned when the skull and spine portions are in the extended position and slackened when the skull and spine portions are in the flexed position. In some examples, each pair of adjacent vertebrae of the spine portion can be coupled to one another by a hinge, each hinge forming a rotation center in which a respective pair of adjacent vertebrae move relative to each other. In some examples, the hyoid bone can be situated between the styloid process and the anchor point.

In some examples, the training simulator can comprise an epiglottis structure and a glottis structure coupled to the hyoid bone and/or the ligament assembly, wherein the epiglottis and glottis structures are visible to an operator of the training simulator via an opening defined between the mandible and the spine of the somatic skeleton. In some examples, the visibility of the epiglottis and glottis structures can be greater when the skull and spine portions are in the flexed position and the hyoid bone is drawn in the second direction by the second ligament, than when the skull and spine portions are in the extended position and the hyoid bone is drawn in the first direction by the first ligament. In some examples, the training simulator can comprise a blade sized and shaped to extend through the opening defined between the mandible and the spine of the somatic skeleton and apply pressure to the epiglottis structure and/or hyoid bone. In some examples, the epiglottis structure is configured to move in a direction toward the hyoid bone when the blade applies pressure to one or more points along a surface of the epiglottis.

In some examples, the hyoid bone can be configured to move toward and away from the spine portion of the somatic skeleton, wherein the movement of the hyoid bone when the skull and spine portions are in an extended position is restricted relative to the movement of the hyoid bone when the skull and spine portions are in the flexed position. In some examples, the hyoid bone can be configured to move outwardly from the spine portion when the blade applies pressure to the hyoid bone.

In some examples, the training simulator can comprise a tongue portion coupled to the hyoid bone and situated within an opening defined by the mandible and spine portion. In some examples, the spine portion can further comprise a plurality of fixing members, each fixing member configured to fix the relative angle between respective pairs of adjacent vertebrae. In some examples, each vertebrae of the spine portion can be configured to have a respective maximum degree of extension and a respective maximum degree of flexion relative to a neutral position.

In some examples, the mandible comprises one or more incisors, cuspids, molars, or a combination thereof. In some examples, the skull portion can comprise a maxilla bone, the maxilla bone comprising one or more incisors, cuspids, molars, or a combination thereof. In some examples, the mandible can be configured to project outwardly relative to the styloid process. In some examples, the first ligament, the second ligament, and at least one ligament of the ligament assembly can comprise one or more elastic cables, cords, wires, chains, and/or tissue surrogate. In some examples, one or more incisors, cuspids, or molars can comprise an optical device.

In some examples, the blade can comprise a torque transducer. In some examples, the hyoid bone can comprise a pressure sensor along its surface. In some examples, the blade can comprise a sensor configured to measure a force acting on the blade. In some examples, the epiglottis structure can comprise a touch sensor.

In one aspect, a laryngoscopy training simulator is provided. The training simulator can comprise a skeleton structure, a suspension chain, and an epiglottis analogue. The skeleton structure can comprise a styloid process analogue, a mandible analogue, and a longitudinally extending column having a first end and a second end. The styloid process analogue and the mandible analogue can be coupled to and extend outwardly from the first end of the column and the column can be configured to move between an extended state and a flexed state between the first and second ends. The suspension chain can extend parallel to the column and be configured to move with the column between the extended state and flexed state. The suspension chain can comprise a hyoid analogue, a first elastic member coupling the hyoid analogue to the styloid process analogue, a second elastic member coupling the hyoid analogue to the mandible analogue, and a third elastic member coupling the hyoid analogue to an anchor point situated at the second end of the column of the skeleton structure. The glottic analogue can be coupled to the hyoid analogue, wherein the glottic analogue can be visible via a first opening defined between the mandible analogue and the first end of the column, and a second opening defined between the hyoid analogue and a longitudinally extending edge of the column. When the column is in an extended state, the first and third elastic members can be under tension and draw the hyoid analogue in a first direction toward the column, and wherein when the column is in a flexed state, the second elastic member can be under tension and draws the hyoid analogue in a second direction toward the mandible analogue. The visibility of the glottic analogue via the first and second openings can be greater when the column is in a flexed state and the hyoid analogue is drawn in the second direction by the second elastic member, than when the column is in an extended state and the hyoid analogue is drawn in the first direction by the first and third elastic members.

In one aspect, a laryngoscopy training simulator is provided. The training simulator can comprise a somatic skeleton and an airway skeleton. The somatic skeleton can comprise a skull portion having a styloid process and a mandible, and a spine portion coupled to the skull portion and having a plurality of vertebra arranged in a column. The skull portion and the spine portion can be configured to curve into an extended position and a flexed position. The airway skeleton can comprise a hyoid bone, a first ligament coupling the hyoid bone to the styloid process of the skull portion, a second ligament coupling the hyoid bone to the mandible of the skull portion, a cartilage assembly coupled to the hyoid bone, and an epiglottis coupled to the hyoid bone and the cartilage assembly. The first ligament can draw the hyoid bone in a first direction when the skull and spine portions are in the extended position and the second ligament can draw the hyoid bone in a second direction by a first mechanism and a second mechanism when the skull and spine portions are moved from the extended position to the flexed position.

In some examples, the cartilage assembly can comprise a thyroid cartilage coupled to the hyoid bone, a cricoid cartilage coupled the thyroid cartilage, and a trachea coupled at one end to the cricoid cartilage and at the other end to an anchor point located at an opposite end of the simulator as the styloid process. In some examples, the skull and spine portions can be configured to form an extended arch when in the extended position such that resulting tension formed in the airway skeleton extends from the first ligament, through the cartilage assembly, and to the anchor point coupled to the trachea. In some examples, the first ligament can be taut when the skull and spine portions are in the extended position and has slack when the skull and spine portions are in the flexed position. In some examples, the slack in the first ligament can be derived from the first and second mechanisms.

In some examples, each pair of adjacent vertebrae of the spine portion can be coupled to one another by a hinge, each hinge forming a rotation center in which a respective pair of adjacent vertebrae move relative to one another. In some examples, the spine portion can comprise a plurality of cervical vertebrae coupled to the skull portion and a plurality of thoracic vertebrae coupled to the cervical vertebrae. The rotation center of each pair of cervical vertebrae can be situated within a body of one of the respective vertebrae. In some examples, the spine portion can comprise a plurality of fixing members, each fixing member configured to fix the relative angle between each respective pair of adjacent vertebrae. In some examples, each vertebra of the spine portion can be configured to have a respective maximum degree of extension and a respective maximum degree of flexion.

In some examples, the mandible can comprise one or more incisors, cuspids, molars, or a combination thereof. In further examples, the skull portion can comprise a maxilla bone, the maxilla bone comprising one or more incisors, cuspids, molars, or a combination thereof. In some examples, the skull portion further comprises a joint coupled to the mandible, wherein the joint is configured to allow the mandible to project from a base line position. In some examples, projection of the mandible from the baseline position can range from 2 mm to 15 mm. In some examples, the joint can be a temporomandibular joint. In some examples, the second ligament can be an elastic cord.

The various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosure will become more apparent from the following detailed description, claims, and accompanying figures.

BRIEF DESCRIPTION OF THE DRAWINGS

FIG. 14A-14B illustrate an example response of the epiglottis of the training simulator of FIGS. 3A-13 during direct laryngoscopy procedures such that a glottis of the training simulator is at least partially exposed.

DETAILED DESCRIPTION

Figure 1:
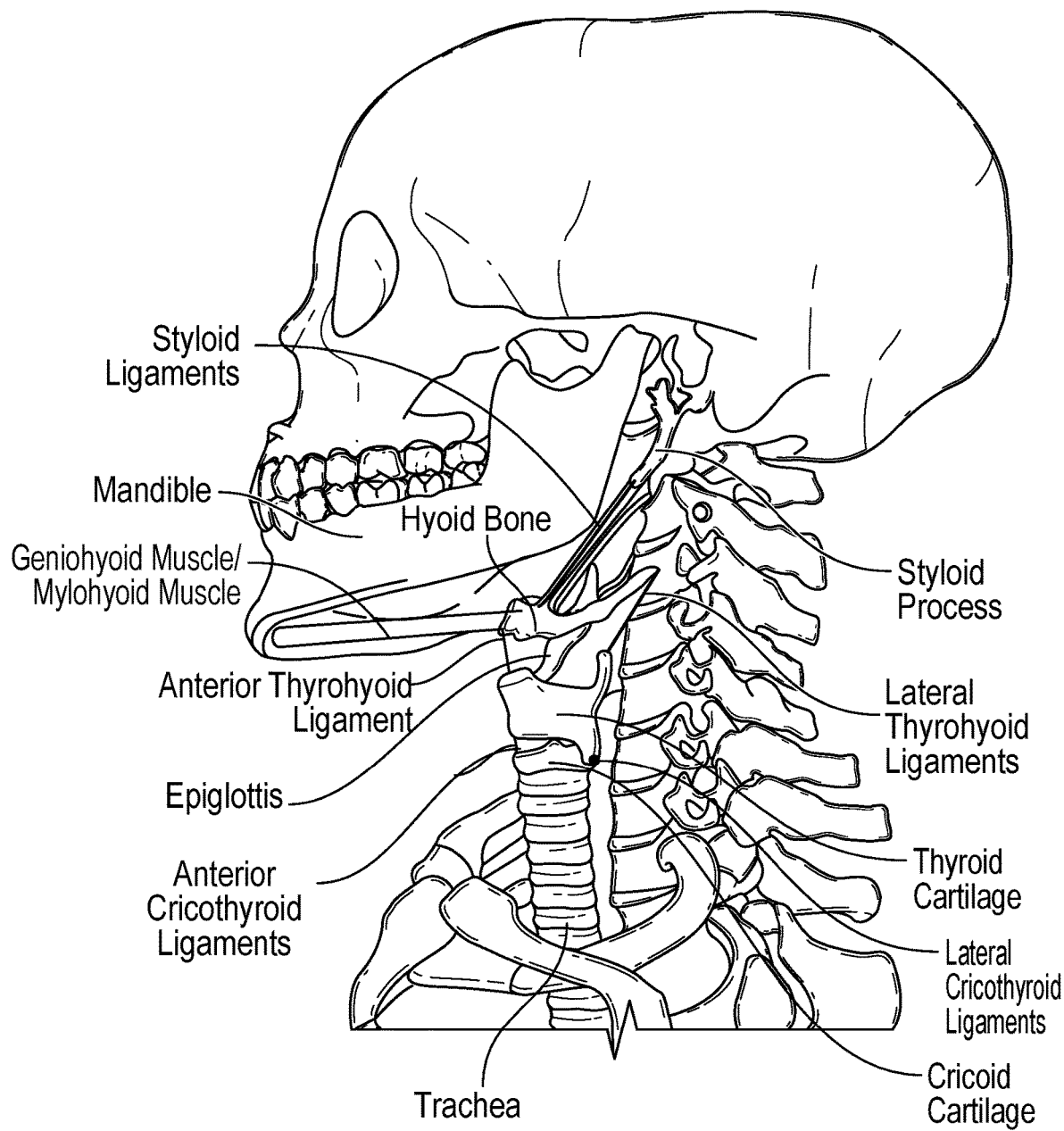
FIG. 1 is a perspective view of the human airway and surrounding anatomy.
Figure 2:
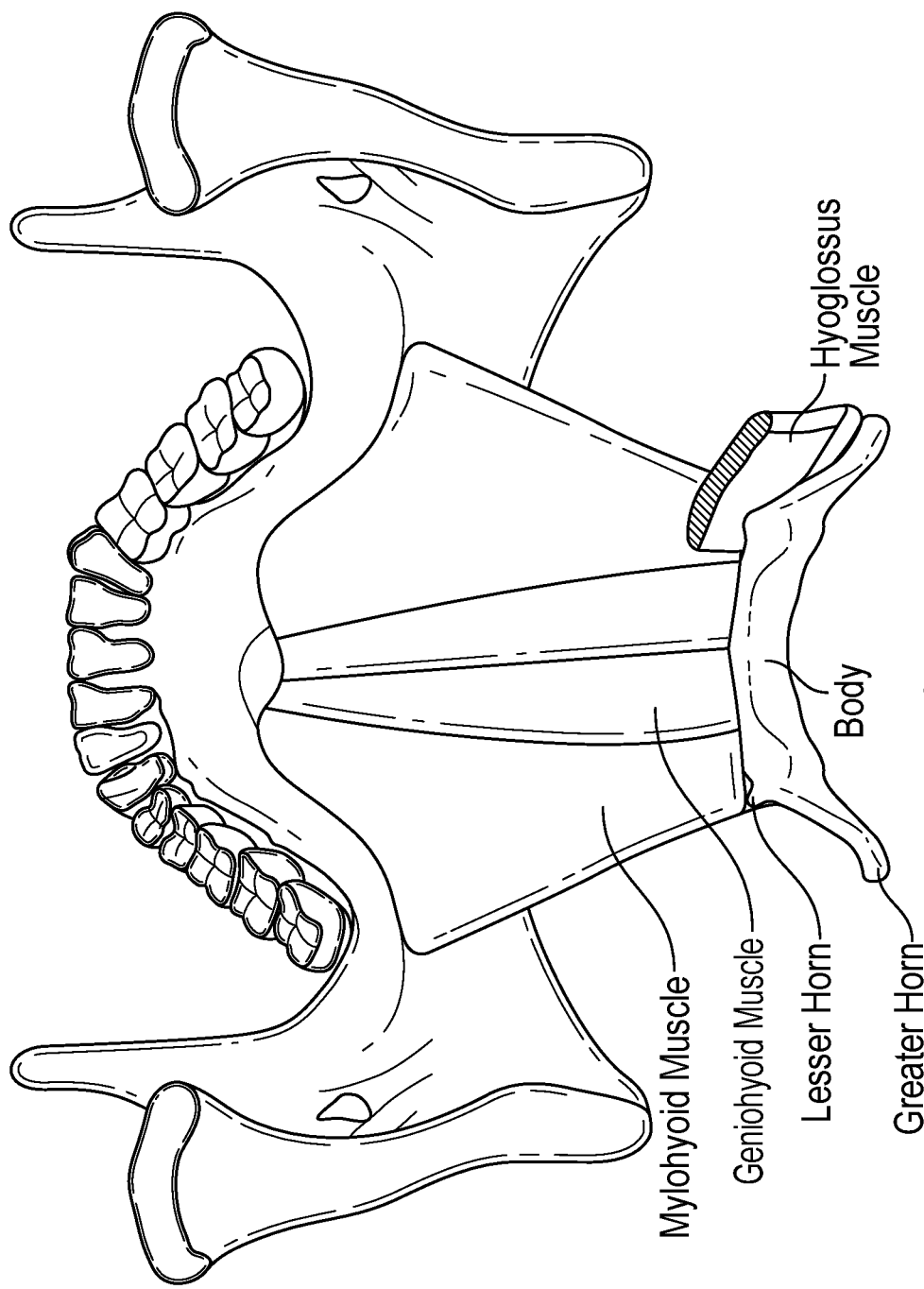
FIG. 2 is a posterosuperior view of a mandible of the human anatomy.

FIGS. 1 and 2 illustrate the airway of the human anatomy. As shown in FIGS. 1 and 2, the hyoid bone is the highest structure in a "airway skeleton" of the human anatomy. The airway skeleton includes the hyoid bone, epiglottis, thyroid cartilage, cricoid cartilage, and trachea. The hyoid bone has a body from which greater horns (or greater cornua) extend back to straddle the anterior of the spine and the vertebrae thereof (i.e., the cervical vertebrae). Lesser horns (or lesser cornua) of the hyoid bone extend upwardly, i.e., superoposteriorly, from the greater horns behind the front surface of the hyoid bone. These lesser horns of the hyoid bone are secured to the styloid process, located at the back of the skull base and above the hyoid bone, via bilateral, stylohyoid ligaments. The epiglottis is situated at the entrance of the airway skeleton and larynx, i.e., attached to the thyroid cartilage and hyoid bone.

The hyoid bone is attached to the thyroid cartilage by one anterior thyrohyoid ligament, two lateral thyrohyoid ligaments to the thyroid cartilage, and a thin sheet of ligament between the anterior and lateral thyrohyoid ligaments. Anterior cricothyroid ligaments and lateral cricothyroid ligaments secure the thyroid cartilage to the cricoid cartilage of the larynx below. The bottom of the cricoid cartilage is secured to the top of the trachea by a fibrous tissue. Downstream from the top of the airway skeleton, the trachea branches at the hilum into two, smaller left and right bronchi, which lead to the lungs.

The epiglottis is situated near and extends a few mm through the location at which the middle tendon of the digastric muscle, such as at the insertion of the muscle at the body of the hyoid bone, passes between the digastric muscle's origination at the mastoid process (i.e., the posterior belly) and its origination under the anterior mandible (i.e., the anterior belly).

Neither the hyoid bone nor thyroid cartilage are secured dorsally. It has been observed that when the laryngoscope blade pulls on the hyoid bone, the lateral thyrohyoid ligaments can pull the upper poles of the thyroid cartilage forward. This can tilt the glottis above the line of sight of the person performing a laryngoscopy procedure. As such, the glottis can be brought back to the line of sight by external pressure on the thyroid cartilage.

As shown in FIGS. 1 and 2, the hyoid bone is also secured to the mandible of the viscerocranium (or facial skeleton), which forms the lower jaw. Specifically, the front surface of the hyoid bone is secured to the mentum of the mandible by the geniohyoid muscle and to the body of the mandible from the anterior via the mylohyoid muscle. The hyoid bone is also attached to the mandible via the hyoglossus muscle, which extends upwardly from the greater horns to form the sides of the tongue (e.g., FIG. 2).

Figure 3A:
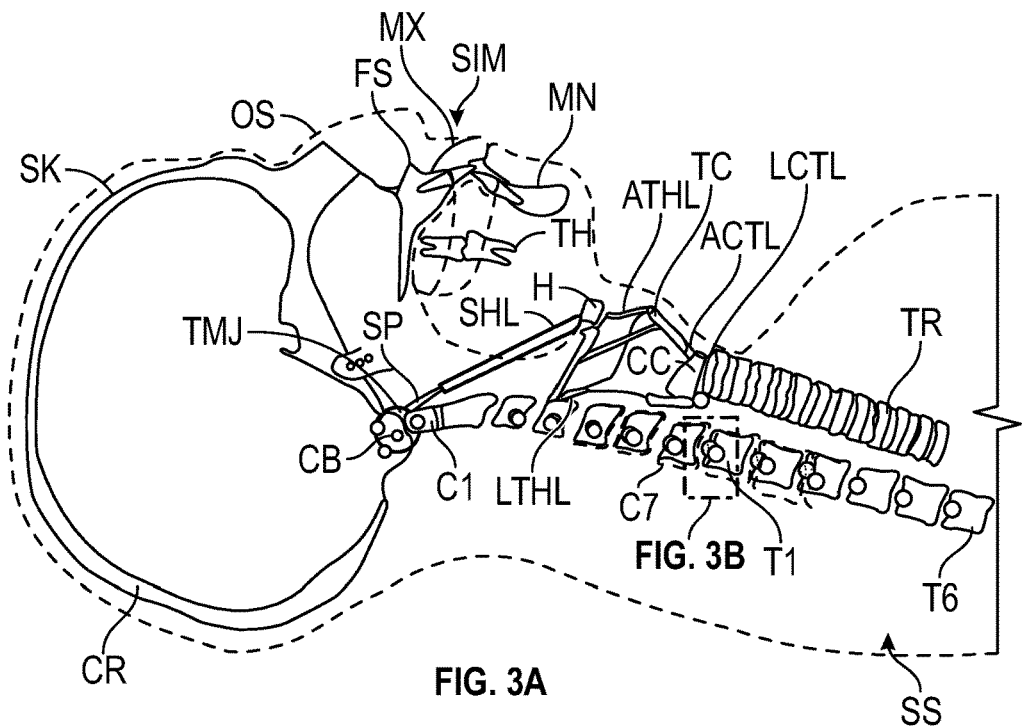
FIG. 3A is a side-view diagram of a training simulator of the present disclosure.
Figure 3B:
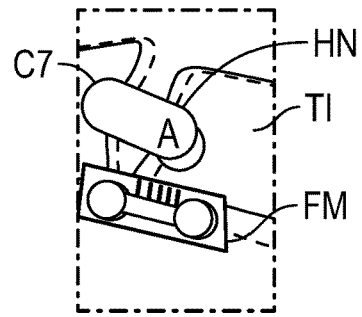
FIG. 3B is an enlarged view of a junction of a pair of adjacent vertebrae of a somatic skeleton of the training simulator.
Figure 3C:
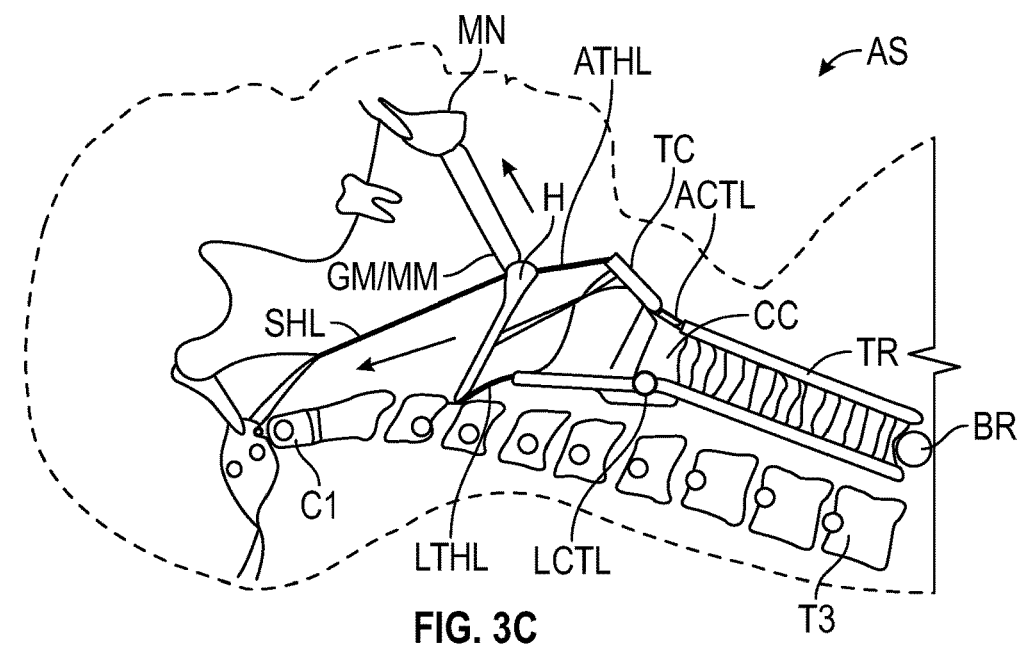
FIG. 3C is a side-view diagram of an airway skeleton of the training simulator.

FIGS. 3A-3C, show a two-dimensional diagram of a direct laryngoscopy (DL) training simulator of the present disclosure. It should be understood the simulator SIM of the following figures is representative of a three-dimensional simulator. While the terminology and labels used in the following description of the simulator SIM may be the same or similar to the terminology used to describe the human anatomy, such as the terminology used above, it should be understood that these terms and labels are merely employed for convenience for describing the physical features, components, and advantages of the simulator SIM. The terminology and labels used in connection with FIGS. 3A-14B, for instance, help to illustrate the relative positioning and interaction of the individual features and components of the simulator SIM, which allow the simulator SIM and its analogues (replicas) or features to react in a realistic manner to the forces applied by a laryngoscope blade during flexion and extension of the simulator's SIM somatic skeleton. It should be appreciated that any of the features or components of the simulator SIM can be structurally similar to its corresponding anatomy, only partially similar to its corresponding anatomy, or can be structured entirely different.

As shown in FIGS. 3A-3C, the simulator SIM can include an airway skeleton AS and a somatic skeleton SS encased within an outer body or outer skin OS, which can be formed to define a head, a throat, a pair of upper shoulders, and/or one or more facial features, such as realistic nose and lips characteristic of a human patient. In some examples, the outer skin OS can be removable in such a way as to expose the underlying structures of the simulator SIM (e.g., the airway and somatic skeletons AS, SS). In such examples, any one or combination of components of the simulator SIM can be repaired, replaced, and/or removed (e.g., to replace analogue tissues, such as tongue T and the ligaments). In other examples, the airway skeleton AS and the somatic skeleton SS need not be encased within an outer skin OS or can be encased only partially. In some examples, the outer skin OS can have a realistic "flesh" tone and/or can be transparent or translucent.

As shown in FIG. 3A, a somatic skeleton SS can be situated within and along the head, throat, and shoulders of the simulator SIM and can include anatomical analogues, such as a skull SK coupled to a plurality of the vertebrae arranged in a spinal column, representative of a set of cervical vertebrae (i.e., vertebrae C1-C7) and a set of thoracic vertebrae (i.e., vertebrae T1-T12). The atlas C1 vertebra of the simulator SIM can be pivotably and/or rotatably coupled to the base of the skull SK and/or to the C2 vertebra such that the skull SK can be rotated, pivoted, and/or otherwise manipulated (e.g., moved in a lateral direction) in a realistic manner. In some examples, the movement of the skull SK (e.g., rotation and/or pivot movement) can be limited to a desired range of motion, such as when limiting rotation and/or lateral movement of the skull SK is desired. For instance, the connection between the atlas C1 vertebra and the skull SK and/or C2 vertebra of the simulator SIM can form a joint with approximately 45 degrees of maximum extension, approximately 15 degrees of maximum flexion, and any degrees between the maximum extension and maximum flexion when limited movement of the skull SK is desired. In some examples, the connection between the atlas C1 vertebra and the skull SK and/or C2 vertebra can provide lateral rotation ranging from approximately 30 degrees in both the left and right directions.

The skull SK of the simulator SIM can include both a neurocranium portion (also referred to as a "cranium") CR and a viscerocranium portion (also referred to as a "facial skeleton") FS. The facial skeleton FS can, for instance, include a mandible bone MN and maxilla bones MX that form and resemble the lower and upper jaw portions of the human anatomy, respectively. The cranium CR can include a cranial roof to form an upper, outer skull portion, and a cranial base CB that can include a styloid process SP and be coupled to the mandible MN and/or the set of cervical vertebrae (e.g., the vertebrae labeled C1-C7 sequentially from the left most vertebrae to the right in FIG. 3A). The junction of the cranial base CB and cervical vertebrae C1 and C2, also referred to as a craniocervical junction, can also be configured to allow flexion and extension when pulled or otherwise manipulated to maintain C spine alignment. In some examples, for the head to be extended, it can be pulled cephalad, otherwise, the vertebrae junctions resist being aligned.

The cranial base CB, in some examples, can also include a structure representative of a temporal bone of the cranium CR of the skull SK from which the styloid process SP extends and/or the mandible MN is movably connected. The lower portion of the cranial base CB and/or temporal bone can, for example, be coupled and configured to articulate with the mandible MN, forming a temporomandibular joint TMJ (e.g., FIGS. 3A and 4A). In some instances, the joint TMJ can be configured to provide relative rotational and/or translational movement between the mandible MN and the skull SK. In such instances, the joint TMJ can allow the mandible MN to open and close, and project forward from a baseline position (i.e., a resting or stationary starting position). In particular examples, the projection of the mandible MN ranges from 2 mm to 15 mm from a baseline position, with a range from 5 mm to 12 mm being a specific example. For example, the joint TMJ can provide forward projection of the mandible MN (such as that portion of the mandible defining the chin) ranging from 2 mm to 15 mm from a baseline position when the mandible MN is an open state (e.g., to simulate when the mouth is open), but little to no projection when the mandible MN is in a closed state (e.g., to simulate when the mouth is closed). In particular examples, the joint TMJ can provide forward projection of the mandible MN ranging from 5 to 12 mm. In some examples, the mandible MN can be coupled to the skull SK such that the mouth opens.

In some examples, the mandible MN and/or maxilla MX of the facial skeleton FS can also include one or more teeth TH, such as incisors, cuspids, and/or molars. The teeth TH can, for example, replicate barriers or obstructions commonly confronted by medical professionals when inserting a laryngoscope blade into a human patient. One or more teeth TH can be removable, though firm and relatively secure to the mandible MN, and interchangeable with one or more differently configured teeth, such that different dental configurations (e.g., the size and/or arrangement) can be constructed while training with the simulator SIM. In some examples, the mandible MN and maxilla MX can include respective incisor teeth TH, which form an interincisor gap G (e.g., FIG. 7A). In such examples, the interincisor gap G can range from 23 mm to 33 mm when the skull SK and mandible MN are flexed forward (FIGS. 8A and 10), with 28 mm being a particular example, and range from 39 mm to 49 mm when the skull SK and mandible MN are at full extension, with 44 mm being a particular example. It should be appreciated that the interincisor gap G can be less than or greater than the values provided, such as when simulating relatively large or small mouthed patients is desired. In some examples, the facial skeleton FS can also include any other portions of the human facial skeleton, such as the nasal, zygomatic, and/or lacrimal portions.

In some examples, the styloid process SP can be configured in such a way that the angular positioning and/or length of the styloid process SP can be adjusted. For instance, the styloid process SP can be rotatably coupled to the skull SK such that the angle of the styloid process SP relative to the skull SK, or other portions of the simulator SIM, can be varied in one or more planes. Moreover, the styloid process SP can be constructed in such a way that its length can be extended and/or reduced, and/or can be removeable and interchangeable with differently configured styloid processes SP. Since the angular positioning and length of the styloid process SP is the radius of rotation when the head is in extension, the adjustable nature of the styloid process SP can be used to assess and demonstrate the effect of differently structured styloid processes on DL procedures.

In some examples, the somatic skeleton SS of the simulator SIM need not include both the cranium CR and facial skeleton FS of the skull SK but can include only the styloid process SP and the mandible MN. In other examples, the skull SK can include only the styloid process SP, mandible MN, and the maxilla MX. In some examples, any combination of the skull SK portions can be used.

The cervical vertebrae C1-C7 and thoracic vertebrae T1-T12 (only T1-T6 are shown in the figures) can be configured such that cervical and thoracic vertebrae of the simulator SIM can be positioned in all and/or a number of clinically feasible combinations. The vertebrae can extend antero-posteriorly to provide stability to the simulator SIM but have a medial cut out to form a prevertebral space in which the airway skeleton AS can be situated and/or include a fastening or coupling member CM (FIG. 4A) to couple at least a portion of the airway skeleton AS to the somatic skeleton SS. As shown in FIG. 3B, which shows an enlarged view of the C7, T1 vertebrae junction, each cervical and thoracic vertebra can be coupled to a respective adjacent vertebra via a hinge HN. Each hinge can include a pivot point or corresponding axle A which allows each hinge to form a rotation center by which adjacent vertebrae pivot and/or rotate relative to one another. Hinges HN with axles A located at rotation centers of the cervical and thoracic vertebrae can, for example, allow the simulated cervical-thoracic arch extending from C2,3 to T4, T5, T6, T7, etc. to be oriented or moved into a full range of positions, such as from an excess lordosis position to a straight spine position. This expansive movement and positioning can allow the operator of the simulator SIM to explore and demonstrate how spine positioning influences DL procedures and the dynamics of the airway skeleton AS, such as transfer of hyoid bone H suspension as the head is moved upward.

In some examples, the rotation centers for the cervical vertebrae can be within the body of each cervical vertebra, while the rotation centers of the thoracic vertebrae can be situated between, and/or approximately between, pairs of adjacent thoracic vertebrae. The distances between different rotation centers in this manner, define vertebral blocks of functional rather than anatomic length. In other examples, each rotation center of the cervical and thoracic vertebrae can be within the body of a respective vertebra, between each pair of adjacent vertebrae, and/or a combination thereof, such as described above.

Each hinge HN and axle A can also be configured to have a predetermined maximum extension angle for when the head is in extension, and a maximum flexion angle when the head is in flexion. The maximum extension and flexion angles can be achieved, for example, via the construction of the hinge HN itself and/or one or more other components configured to limit movement of the hinges about the axles A, to the predetermined maximum angles. One or more fixing members FM (FIG. 3B), in some examples, can also be situated at the junction of adjacent vertebrae to fix the positioning of a corresponding hinge HN at the axle A, thereby fixing the angle between each pair of adjacent vertebrae. In this configuration, the relative angle between each pair of adjacent vertebrae can be positioned and fixed at an angle prescribed for supine, extension, flexion, head thrust, and/or other clinically relevant positions for training purposes. In some examples, the fixing members FM can be a set screws configured to fix respective pairs of adjacent vertebrae to a particular angle. In other examples, a variety of other fixing members can be used, such as pins, flexible members, snap-and-fit mechanisms, etc. In some examples, two or more vertebral junctions or rotation centers may be combined into a single vertebral rotation center when the effect on the axial tension and slack in the airway skeleton AS suspension chain, as described herein, is the same as when the respective vertebral rotation centers are separate. Such a configuration, for example, can simplify the structure and manufacture of the vertebrae columns of the simulator SIM.

Figure 4A:
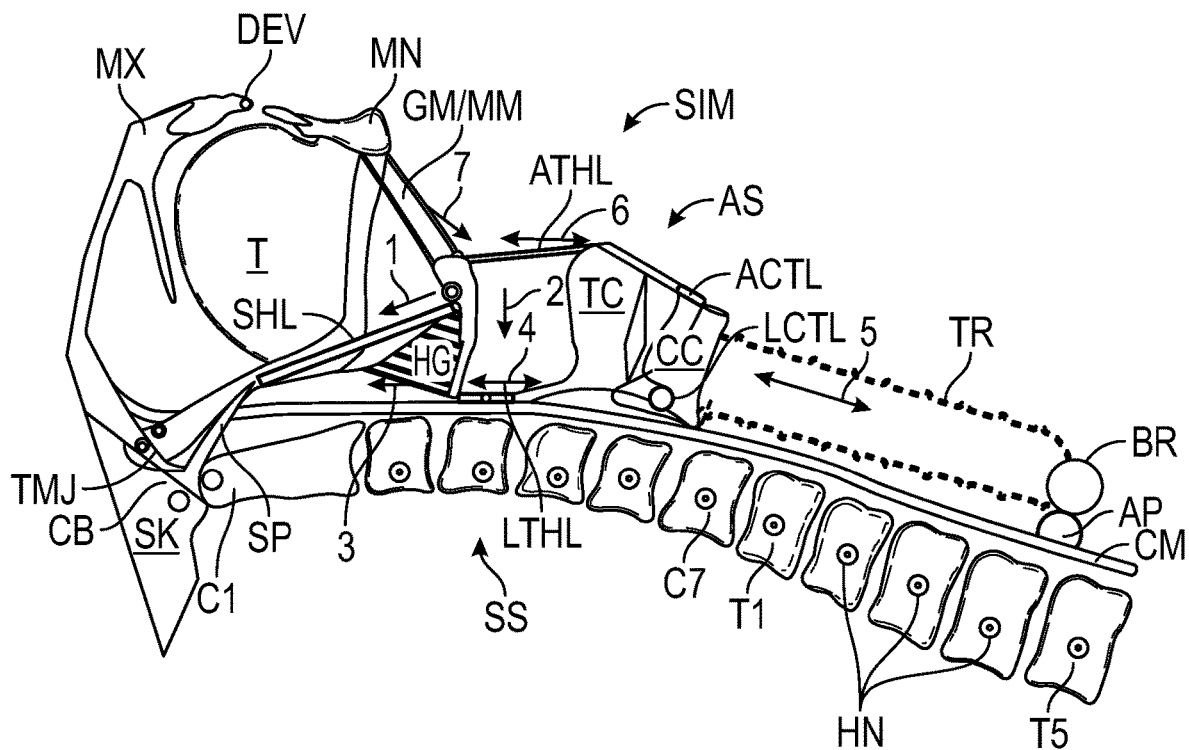
FIG. 4A is a side-view diagram of the somatic skeleton and the airway skeleton of the training simulator of FIGS. 3A-3C.
Figure 13:
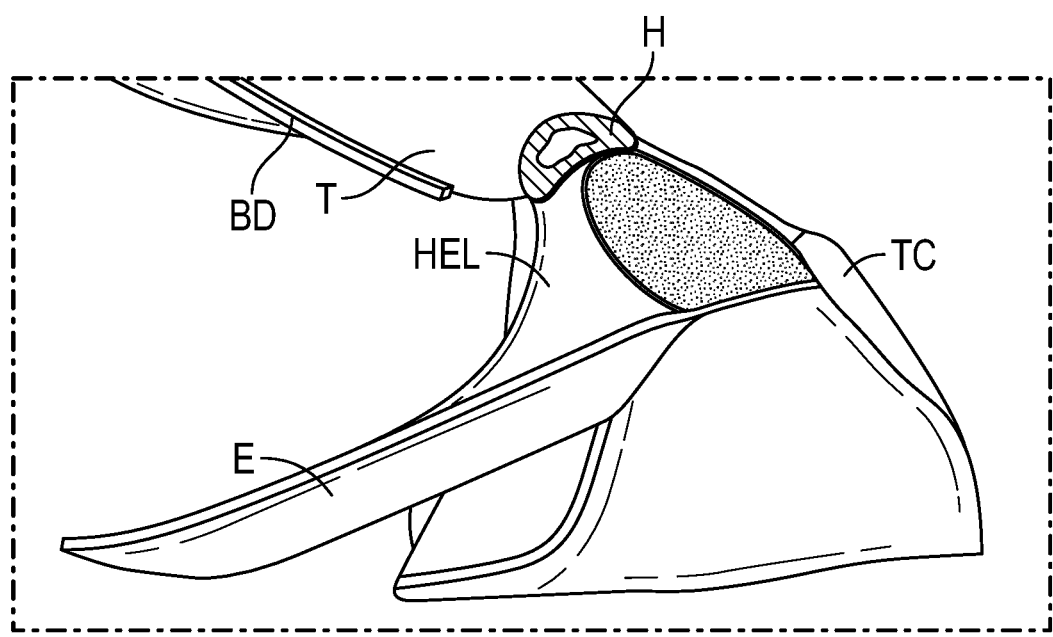
FIG. 13 is a diagram of a tongue, a hyoid, and an epiglottis of the training simulator of FIGS. 3A-12A.

FIGS. 3C and 4A show that the training simulator SIM can include an airway skeleton AS structured and configured to functionally resemble the airway of the human anatomy. Specifically, the airway skeleton AS can include anatomic analogues, such as a hyoid bone H, a thyroid cartilage TC, cricoid cartilage CC, and a trachea TR. An analogue epiglottis E can also be situated at the entrance of the airway skeleton AS and configured to react to external forces in a realistic manner, such as to open and close under forces applied by a laryngoscope blade BD (FIGS. 13-14B). The simulator SIM can also include a structure that forms a glottis G (FIGS. 14A-14B) which can be coupled to or otherwise be integrated with the epiglottis E or other portion of the airway skeleton AS such as to provide an analogue structure for the glottis exposure mechanisms described herein.

The airway skeleton AS can also include a plurality of analogue features or components to simulate ligaments and/or muscles that form the airway skeleton AS and couple portions of the airway skeleton AS to the somatic skeleton SS, similar to the human anatomy described above in reference to FIGS. 1-2. In particular, the airway skeleton AS can include analogue bilateral stylohyoid ligaments SHL coupling the superior surface of the hyoid bone H to the styloid process SP of the skull SK, anterior and lateral thyrohyoid ligaments ATHL, LTHL coupling the hyoid bone H to the thyroid cartilage TC, and anterior and lateral cricothyroid ligaments ACTL, LCTL coupling the thyroid cartilage TC to the cricoid cartilage CC. The cricoid cartilage CC can be coupled to the trachea TR, and the trachea TR can be coupled to a simulated hilum BR downstream from the rest of the airway skeleton AS. The hilum BR in this instance, can also serve as an anchor point AP at which the trachea TR is secured to the simulator SIM, thereby providing similar tension in the airway skeleton AS and trachea TR as observed in human anatomy (e.g., between the styloid process SP and hilum BR). The hyoid bone H can also be coupled to a mentum of the mandible MN of the skull SK via a geniohyoid muscle GM and/or a mylohyoid muscle MM. A hyoglossus muscle HM, which extends upwardly from the greater horns of the hyoid bone H (e.g., FIG. 4A) can also be included to further couple the hyoid bone to the mandible MN and form a tongue T (FIG. 4A), or a portion thereof. In some examples, the simulator SIM can include any one or combination of the geniohyoid muscle GM, mylohyoid muscle MM, and hyoglossus muscle HM to couple the hyoid bone H to the mandible MN. A digastric muscle (not shown) can also be coupled to the hyoid bone H at a lesser cornua (or other attachment point), mandible MN, and skull SK, and can serve as an axle to tilt the hyoid bone H at different angles relative to the mandible MN.

The arrangement of the airway skeleton AS described herein allows the hyoid bone H to be rotated forward at or proximate the placement of where the hyoid bone H is secured via the stylohyoid ligaments SHL to the styloid process SP. This can provide, as just one example, the simulation of sticking the tongue T of the simulator SIM out or lifting the tongue T forward causing greater displacement forward than laterally.

In some examples, the ligaments and/or muscles of the simulator SIM can be constructed of one or more elastic cables, cords, wires, chains, and/or tissue surrogate, to simulate the particular dynamics of the corresponding human anatomy. It should be understood that the tissues, ligaments, and/or muscles of the simulator SIM, and other components thereof, can be constructed from a variety of materials, which can replicate the dynamics of the human anatomy, be resilient and resistant to wear, and have a realistic look and feel (e.g., soft, supple, yielding, fleshy, etc.).

As one example, the stylohyoid ligaments SHL can be constructed from a cable, while an elastic-tissue surrogate or elastic cord can be used to simulate the geniohyoid and mylohyoid muscles GM, MM such that the hyoid bone H "floats" within the airway skeleton AS. In this way, the airway skeleton AS of the simulator SIM can respond in the same manner as the airway skeleton of the human anatomy, such that elevation of the head of the simulator SIM by flexion of the cervical and thoracic spine will lift the hyoid bone H above the airway, exposing a simulated glottis situated under the epiglottis E of the simulator SIM.

As another example, as described in further detail below, when head extension rotates the styloid process SP, the hyoid bone H can be pulled cephalad and slide, e.g., along paravertebral depressions, until any slack in the lateral thyrohyoid ligaments LTHL is removed or substantially removed and the ligaments LTHL become taut or tensioned. When this occurs, axial tension can develop in the entire airway skeleton AS suspension chain of the simulator SIM. The airway skeleton AS suspension chain (also referred to as a ligament assembly) can comprise any combination of the styloid ligaments SHL, hyoid bone H, lateral thyrohyoid ligaments LTHL, thyroid cartilage TC, cricoid cartilage CC, lateral cricothyroid ligaments LCTL, anterior thyrohyoid ligaments ATHL, anterior cricothyroid ligaments ACTL, and the trachea TR to its base in the lung hilum BR. Because this tension extends along the airway skeleton AS suspension chain above and below the hyoid bone H, the hyoid bone H can be constrained against, directly or indirectly, the cervical vertebrae as would occur in a human patient. A greater cornua (or like structure) of the hyoid bone H can rotate cephalad when constrained, thus further lowering the line of sight. Accordingly, the airway and somatic skeletons AS, SS of the simulator SIM of the present disclosure are operable to accurately reproduce realistic hyoid movement in response to the same or similar head and spine movement observed in the human anatomy, which existing conventional training mannequins are unable to achieve.

It should be appreciated that any component or feature which is coupled to a ligament and/or muscle of the simulator SIM can have an anchor and/or attachment point which allows the ligaments and/or muscle to be secured to that component or feature. In some examples, the anchor and/or attachment points can allow the ligaments and muscles to be coupled and decoupled from the component or feature.

In representative examples, one or more sensors and/or electronic devices can be included and incorporated into the simulator SIM. As one example, an optical device DEV (FIG. 4A), such as a camera and a lens, can be situated at the tips of the upper incisors and/or right canine of the teeth TH to provide an instructor a view as close to the operator or trainee's view as possible. In such examples, multiple optical devices DEV and teeth TH can be used to account for movement of the other components which may obstruct such view, such as a tongue T (FIG. 4A) and/or muscles.

In some examples, a torque transducer TT (FIG. 6) can be included in a laryngoscope handle to objectify how much positioning impacts the workforce of intubation. Observations of the position and torque on degree of glottis exposure in difficult cases can, for example, reinforce by experience the value of following a sequence to achieve desired exposure rather than be satisfied by adequate exposure, so that when presented by an unpredicted difficult case the optimal procedure is minimally different from the usual procedure. Rather than using average subjects and assuming operators with average strength this will help make apparent how challenging a difference in size can be.

In further examples, a sensor SEN1 (FIG. 6) can be configured to measure the vector force on the blade BD to objectify the value of tilting the blade forward and reinforce manually testing for optimal direction. In other examples, the simulator SIM can include and/or be in communication with a processor and memory configured to provide a graphic or image on a display the degree of flexion and extension at each intervertebral junction to make clear what changes in axial position are causing a particular observed effect. A processor and memory can also be configured to provide an image which shows the position of the hyoid bone H within the simulator SIM, such as to determine whether the hyoid is still below or has been pulled to above the line of sight to achieve a higher a percentage of glottis opening score (POGO). In some examples, the simulator SIM can be coupled to a simulation monitor, or processor and memory, which is configured to display a simulated oxygen saturation, end-tidal $CO_2$ detection/capnography, electrocardiogram (ECG or EKG), and/or other vital signs.

Touch sensors SEN3, SEN4 in left and right epiglottic vallecula (FIGS. 14A-14B) of the epiglottis E can also be included in the simulator SIM, in some examples, to indicate positioning of the laryngoscopy blade BD and/or epiglottis E which may be helpful to show whether certain positioning is adequate in a particular case or whether it indicates suboptimal practice.

In some examples, a pressure sensor SEN2 (FIG. 6) on the cephalad surface of the hyoid bone H can be included to measure the force acting on the hyoid bone H (e.g., by a laryngoscope blade), which can be used to show the relationship between external pressure on the hyoid bone H and the operator's experience during blade insertion (e.g., while holding and manipulating the laryngoscope handle) and under different conditions (e.g., variations in size of the tongue). One or more sensors can also be included on a surrogate hyoepiglottic ligament, such as one just below the hyoid bone H, to measure movement of the epiglottis during training, such as during opening and closing. In further examples, a sensor can also be included and configured to measure the force required to elongate the trachea and thereby the viscoelastic resistance which may oppose hyoid lift while using the incremental mechanism described below.

Medical literature has established that head elevation (i.e., flexion) improves glottic exposure during laryngoscopy, and is especially useful in difficult-to-see cases. Currently, there is resistance to DL training that applies a head-elevated technique because the head-elevated technique has been deemed "counter-intuitive" in comparison to the widely conventional "tip-the-head-back" approach (i.e., head in an extended position). Accordingly, the absence of an available anatomic simulator which can demonstrate the utility of head-elevated technique is desired. The training simulator SIM of the present disclosure, unlike existing conventional training mannequins, can provide the operator with improved efficiency and quality of glottis exposure when the head-forward position is imposed, thereby improving training and overall success of laryngoscopy, which can in turn lower the rate of failed endotracheal tube insertion in human patients. This can lead to less morbidity and mortality during intubation of critically ill patients both in the field and in hospital settings. Training using the simulator SIM of the present disclosure, therefore, can shorten the learning curve for direct laryngoscopy, and lower morbidity and mortality for routine cases as well.

FIGS. 4A-14B illustrate the movement and dynamics of the airway skeleton AS and somatic skeleton SS of the simulator SIM. For the purpose of illustration and ease of discussion, FIGS. 4A-14B illustrate the airway skeleton AS and somatic skeleton SS of the simulator SIM, and/or portions thereof. It should, therefore, be understood that any structure and/or functionality described in the following examples can be combined with any of the examples of the simulator SIM already described in connection with FIGS. 3A-4A.

FIG. 4A shows a two-dimensional representation of the three-dimensional simulator SIM and illustrates the interaction of the airway and somatic skeletons AS, SS when the head is positioned in an extended position, as described below. FIG. 4A shows that the styloid ligaments SHL, lateral thyrohyoid ligaments LTHL, lateral cricothyroid ligaments LCTL, anterior thyrohyoid ligaments ATHL, and anterior cricothyroid ligaments ACTL connect the structures of the airway skeleton AS, which together form the airway skeleton AS suspension chain. This airway suspension chain, which includes the trachea TR, becomes taut during extension. The labeled arrows 1-7 shown in FIG. 4A, for instance, indicate the direction of axial tension and a sequential order (e.g., sequentially from arrow 1 to arrow 7) by which axial tension can occur in the respective ligaments and trachea TR during extension. Other sequences can also be implemented. The hinges HN and axles A indicate the rotation centers of the cervical vertebrae C3-C7 and thoracic vertebrae T1-T5, as described above in connection with FIGS. 3A-3B.

Figure 4B:
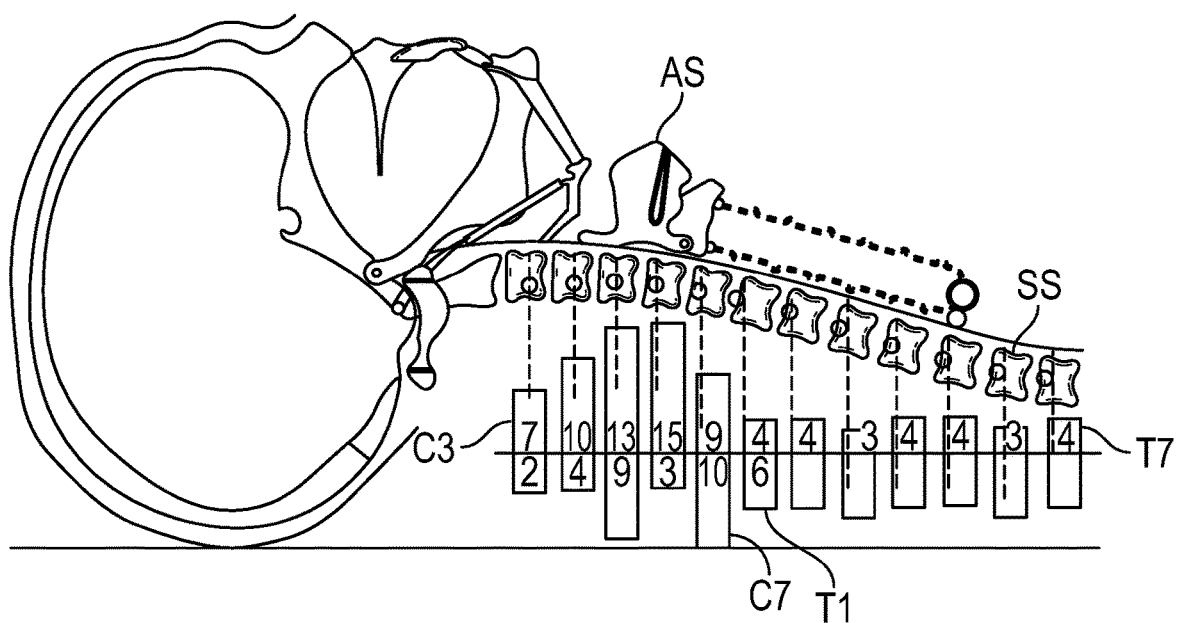
FIG. 4B is a side-view diagram illustrating degrees of flexion and extension of the training simulator of FIGS. 3A-4A.

FIG. 4B shows the simulator SIM in a neutral position, i.e., in a supine position, and shows the degree of movement the cervical and thoracic vertebrae C1-T5 can provide to the simulator SIM relative to the neutral position. The vertical bars shown in the lower half of FIG. 4B, in particular, represent the average maximum degrees of flexion (above the line) and maximum degrees of extension (below the line) for each cervical and thoracic vertebrae C3-T5, from left to right. The numbers of each of the respective bar are given in degrees. The average maximum degrees of flexion and extension can represent the corresponding average degrees of flexion and extension in a population with normal morphology. The average maximum flexion and extension can be achieved and fixed, for instance, via the hinges HN and fixing members FM (FIG. 3B) of the vertebrae, respectively. While described with some particularity, it should be appreciated that the express values given in FIG. 4B for the average maximum degrees of flexion and extension can be modified as desired.

While in the neutral position, in some examples, there is relatively little to no vertical or axial tension in the airway skeleton AS system of the simulator SIM. In the neutral position shown in FIG. 4B, for instance, the hyoid bone H can "float" in the bed of geniohyoid and mylohyoid muscles GM, MM (and also the hyoglossus muscle HM) coupling the hyoid bone H in one or more directions to the mandible MN. The stylohyoid ligaments SHL can be at approximately full length and under little to no tension in the neural position. The trachea TR, cricoid cartilage CC, and thyroid cartilage TC can rest on the hilum base BR, and there can be ~2-6 mm "slack" in the lateral thyrohyoid ligaments LTHL between the thyroid cartilage TC and hyoid bone H, with ~4 mm slack being a particular example.

The stylohyoid ligaments SHL can be under little to no tension until the head (i.e., skull SK) is extended about 25% from the neutral position. When the head is extended, the hyoid bone H can be pulled axially toward the skull SK (e.g., arrows 1-4 in FIG. 4A). This axial force acting on the hyoid bone H can create tension in the thyrohyoid ligaments LTHL and take up the ~4 mm slack in the lateral thyrohyoid ligaments LTHL, which then pulls axially on the thyroid cartilage TC. This axial force acting on the hyoid bone H, can establish axial tension along the entire airway skeleton AS system (e.g., arrows 1, 4, 5-6 in FIG. 4A).

The thyroid cartilage TC and cricoid cartilage CC can be secured by the lateral cricothyroid ligaments LCTL which can form capsular hinges that allow the thyroid cartilage TC to tilt forward (e.g., away from the vertebrae of the spine) on the cricoid cartilage CC. However, the cricothyroid ligaments LCTL can be limited in their axial movement (e.g., toward the skull SK) and the lateral thyrohyoid ligaments LTHL can remain at full or substantially full length during direct laryngoscopy, so a change in length can be limited to the trachea TR. The initial movement of the thyroid and cricoid cartilages TC, CC during head extension, therefore, can extend the airway skeleton AS of the simulator SIM to a full or a near full length, similar to what occurs in the human anatomy when the head of a patient is extended. In some examples, the simulator SIM need not have both the thyrohyoid and/or cricothyroid ligaments LTHL, LCTL. As one example, the simulator SIM can have a three-cable suspension system including the stylohyoid ligaments SHL, the geniohyoid and mylohyoid muscles GM, MM, and lateral thyrohyoid ligaments LTHL (FIGS. 9-10) to achieve the functionality described herein.

Flexion and extension of the vertebrae of the spine can cause the airway skeleton AS to slide axially in front of the vertebrae along a coupling mechanism CM (FIG. 4A), which can be situated between the trachea TR and cervical and thoracic vertebrae C1-T5. The coupling mechanism CM (FIG. 4A) can serve as an analogue to the areolar tissue found within the human anatomy and/or be used in conjunction with a medial cut out defining a prevertebral space for the airway skeleton AS to move axially. The coupling mechanism CM, in some examples, can be constructed of a tissue surrogate or other suitable material such that the airway skeleton AS can move or be guided axially along the vertebrae, such as along a track, wire, etc. In other examples, the coupling mechanism CM need not be included in the simulator SIM for the airway skeleton AS to move axially along the vertebrae. In some examples, the cricoid cartilage CC and/or hilum BR (e.g., via anchor point AP) can be coupled to coupling mechanism CM (e.g., FIGS. 5A-6 and 9-10).

From full extension to full flexion of the neck, the posterior of the hyoid bone H can slide or move axially an average of 42 mm, while the thyroid and cricoid cartilages TC, CC can slide or move axially an average of 38 mm. This difference in axial movement is due to the "slack" in the lateral thyrohyoid ligament LTHL. Moreover, the anterior structures move a greater distance because they are further from the rotation centers of the cervical and thoracic vertebrae but are accommodated by the elastic flexibility of the materials forming the anterior thyrohyoid and cricothyroid ligaments ATHL, ACTL.

As the head and neck of the simulator SIM are moved to a flexion position, the point of suspension of the airway skeleton AS can transfer from the base of the skull SK via the stylohyoid ligaments SHL and styloid process SP, to the mentum of the mandible MN via the geniohyoid, mylohyoid, and/or hyoglossus muscles GM, MM, HM used to secure the hyoid bone H to the mandible MN. This change in the suspension of the airway skeleton AS is characteristic of the reconfiguration the airway skeleton AS goes through in the human body as the airway skeleton AS adapts to maintain airway patency when the head moves from upward and backward (i.e., extension) to forward and downward (i.e., flexion).

The change in the airway skeleton AS suspension can be the mechanism by which elevating the head, and more specifically thrusting the chin of the mandible MN, dramatically eases DL. This is because the change in suspension can swing or otherwise move the hyoid bone H forward. That is, head extension of the simulator SIM can tense the stylohyoid ligaments SHL, pulling the hyoid bone H, tongue T, and epiglottis E up and back, to resist the lift forward by a laryngoscope blade while performing conventional DL procedures on the simulator SIM. In contrast, flexion, especially of the lower cervical and upper thoracic vertebrae C1-T5 of the spine, can release tension in the stylohyoid ligaments SHL and swing or otherwise move the hyoid bone H away from the spine and toward the chin of the mandible MN. In some examples, the tongue T and epiglottis E can move along with the hyoid bone H. Accordingly, the simulator SIM can be useful to demonstrate the movement and dynamics of hyoid lift with the head extended when using conventional DL techniques, as well as flexion to expose the glottis by DL when the head is elevated.

Figure 5A:
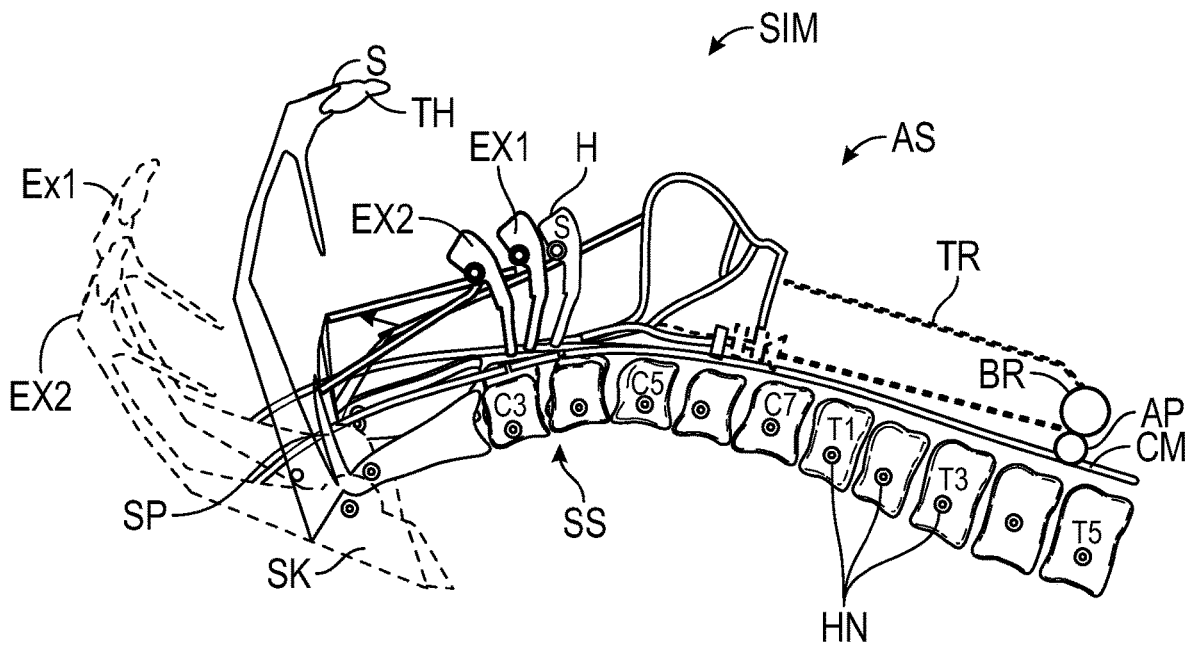
FIGS. 5A-5B are side-view diagrams illustrating sequential movement of the somatic and airway skeletons of FIGS. 3A-4B.
Figure 5B:
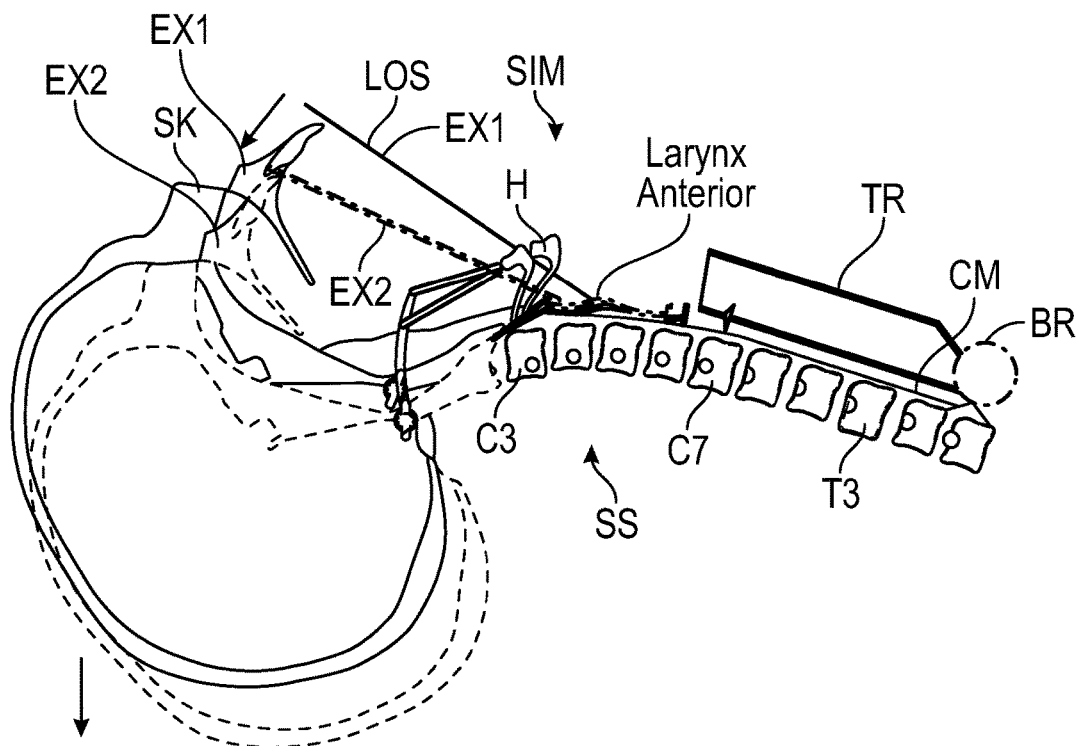
Figure 6:
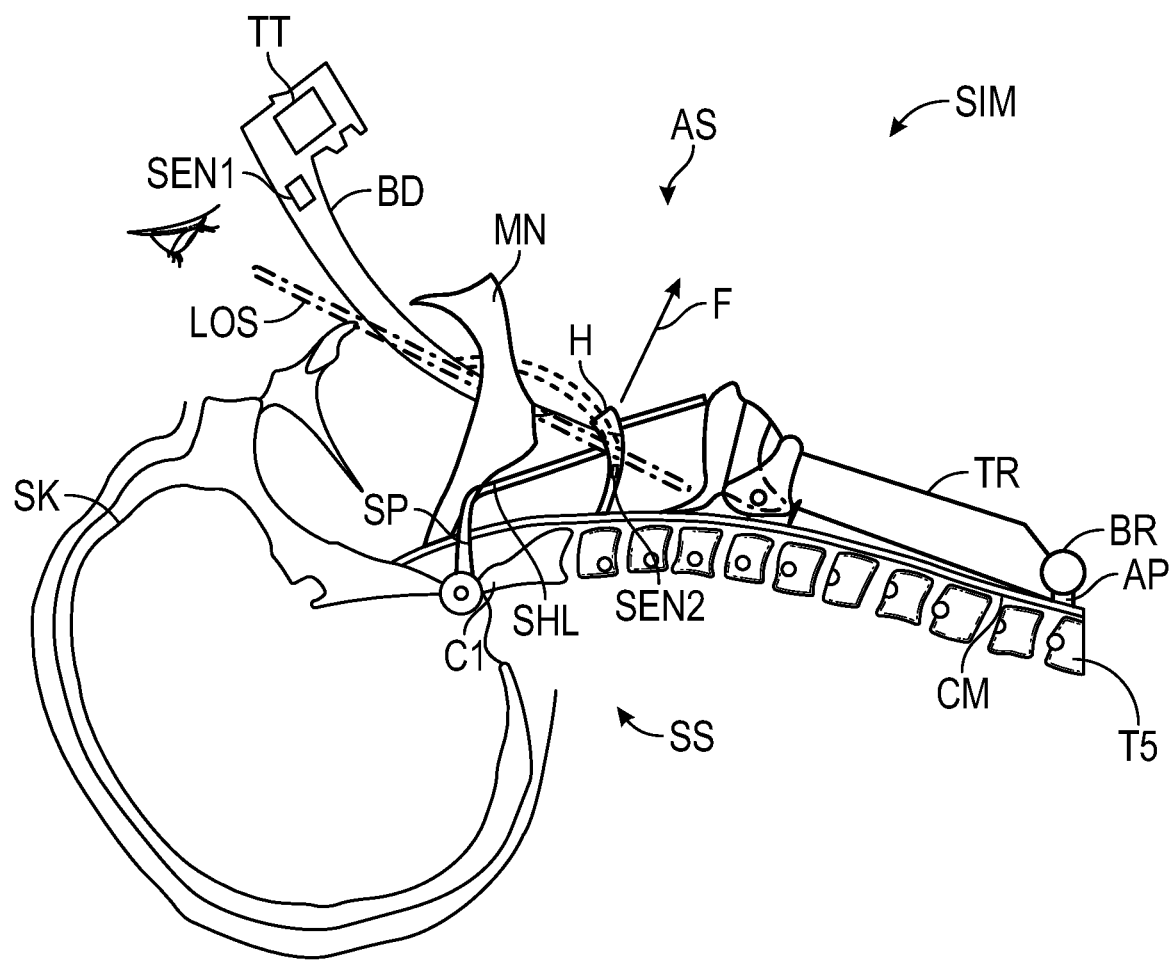
FIG. 6 is a side-view diagram illustrating a direct laryngoscopy training procedure on the somatic and airway skeletons of FIGS. 3A-5B.

FIGS. 5A-5B and 6, as an example, show the dynamics of the airway and somatic skeletons AS, SS when the head of the simulator SIM is extended, with FIG. 6 showing a conventional laryngoscope blade BD inserted. As shown in FIGS. 5A-5B, which show exemplary sequential movement of the simulator SIM during extension, head extension can rotate the styloid process SP, thereby pulling the hyoid bone H from a supine position (S in FIG. 5A) to a first extended position (EX1 in FIGS. 5A-5B). Extension of the lower cervical vertebrae C1-C7 can rotate the head and upper cervical vertebrae dorsally, further pulling the hyoid bone H from the first extended position (EX1) to a second extended position (EX2 in FIGS. 5A-5B) where the larynx appears anterior. Each movement of extension, i.e., from a supine position (S) to the second extended position (EX2), can tense the stylohyoid ligaments SHL which in turn pull the hyoid bone H cephalad and tense the ligament chains below the hyoid bone H. As shown in FIGS. 5A-5B, each extension lowers the external barrier of the teeth TH (e.g., upper incisors) but also pulls the hyoid bone H cephalad, which decreases, rather than increases, the line of sight LOS.

FIG. 6, which shows the laryngoscope blade BD inserted into the simulator SIM, shows that extension of the head can tense the stylohyoid ligaments SHL and ligament chains below the hyoid bone H, by rotating the styloid process SP cephalad. As demonstrated in FIGS. 5A-5B, extension can result in axial tension restraining the hyoid bone H against the spine, thereby resisting the lifting force F applied by the laryngoscope blade BD shown in FIG. 6. The simulator SIM in this way is configured to react or simulate in a realistic manner the resistance the hyoid bone H exhibits when a patient's head is in the extended position. Flexion, in contrast, can ease glottis exposure in the simulator SIM in a similar manner as the human anatomy by three mechanisms: (1) based on incremental reduction of the length of the arch over which the airway is stretched; more abruptly (2) by transferring hyoid suspension from the base of the skull SK behind and above the hyoid bone H, to the mentum of the mandible MN below and in front of the hyoid bone H; and (3) via forward tilt of the upper airway skeleton AS relative to the cricoid cartilage CC.

Mechanism 1: Flexion-Based Incremental Easing of Glottis Exposure

Figure 7A:
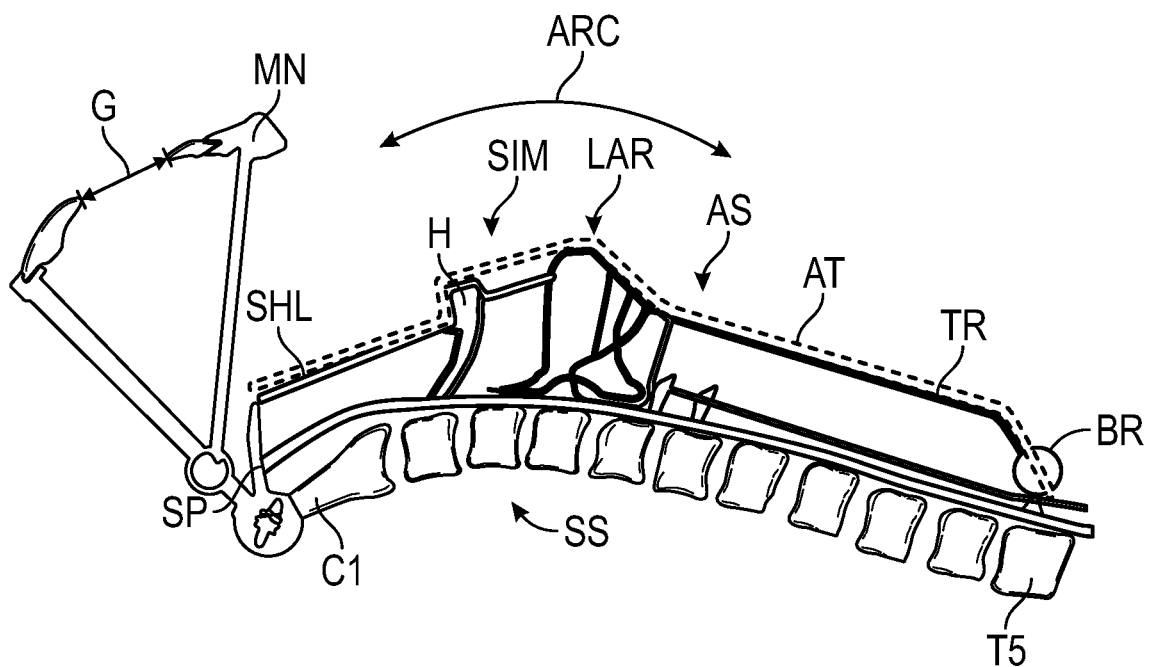
FIGS. 7A-7B are side-view diagrams of the somatic and airway skeletons of FIGS. 3A-6.
Figure 7B:
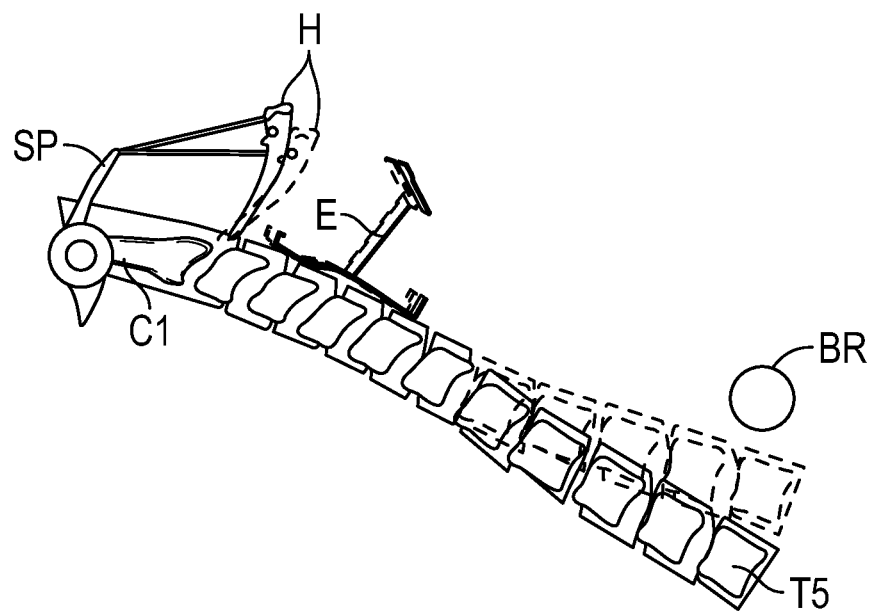

Flexion anywhere in the spine of the simulator SIM from the cervical vertebrae C2 or C3 to about the thoracic vertebrae T4 or T5 and lower, can reduce axial tension along the airway skeleton AS by decreasing the distance between the styloid process SP and hilum BR slightly. For example, as illustrated in FIG. 7A, axial tension in the airway skeleton AS, generally shown as dashed lines AT, is established by rotation of the styloid process SP pulling directly on the stylohyoid ligaments SHL and creating an arch ARC in the airway skeleton AS when the head is in the extended position. This axial tension is relieved by flexion in the vertebrae C1-T5 of the spine, which slightly lowers the arch and reduces the relative total distance over which the airway skeleton AS is extended, as illustrated in FIG. 7B.

Figure 8A:
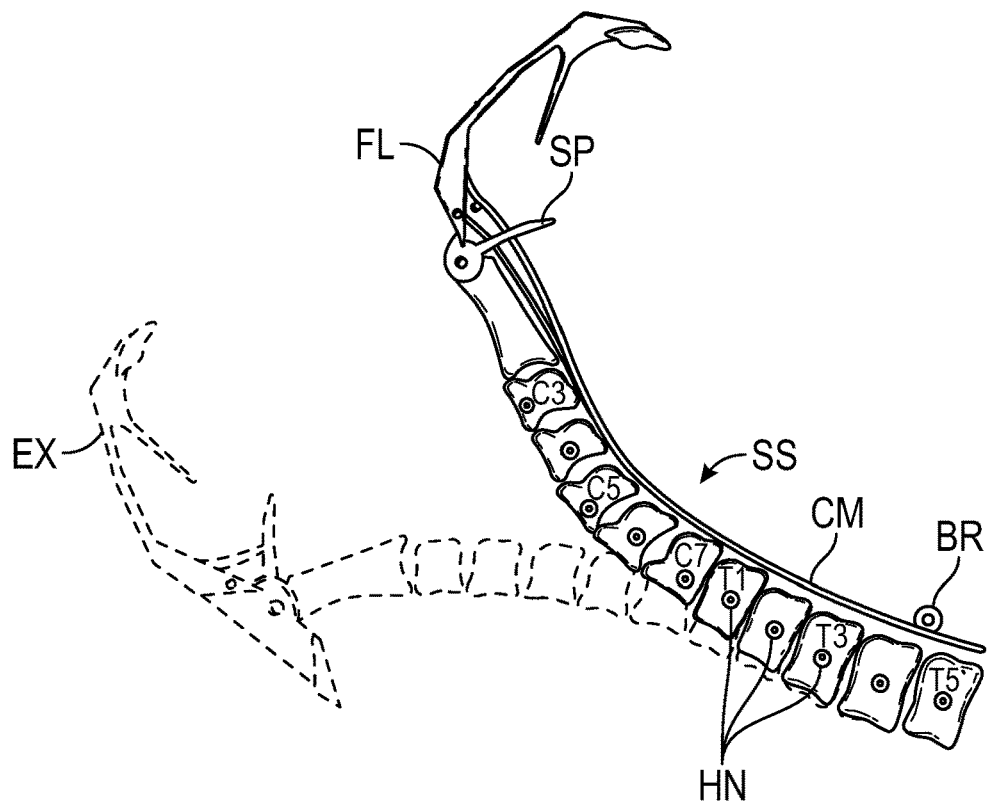
FIGS. 8A-8B are side-view diagrams illustrating sequential movement of the somatic skeleton of FIGS. 3A-7B.

Absent a laryngoscope, flexion in the cervical vertebrae of the simulator SIM can completely relieve or substantially relieve axial tension in the airway resulting from styloid process SP forward rotation, due to the gradual reduction in the length of the arch of the airway skeleton AS. The resulting "slack" in the airway from flexion also allows a lifting force applied by a laryngoscope blade BD to lift the hyoid bone H away from the vertebrae C1-T5 of the spine and up the arc defined by the stylohyoid ligaments SHL with greater ease than when the head is extended. In particular, because the length of the larynx LAR can be constant at its extended length and the trachea TR can maintain a constant length under constant tension, flexion anywhere in the cervicothoracic spine down to, or below thoracic vertebrae T5, results in glottis movement a short distance cephalad and the hyoid bone H lifted up its SHL-defined arc. For instance, FIGS. 8A-8B show that flexion at adjacent rotation centers of the cervicothoracic vertebrae C3-T5 of the simulator SIM progressively reduces the distance between the styloid process SP and hilum BR.

Figure 8B:
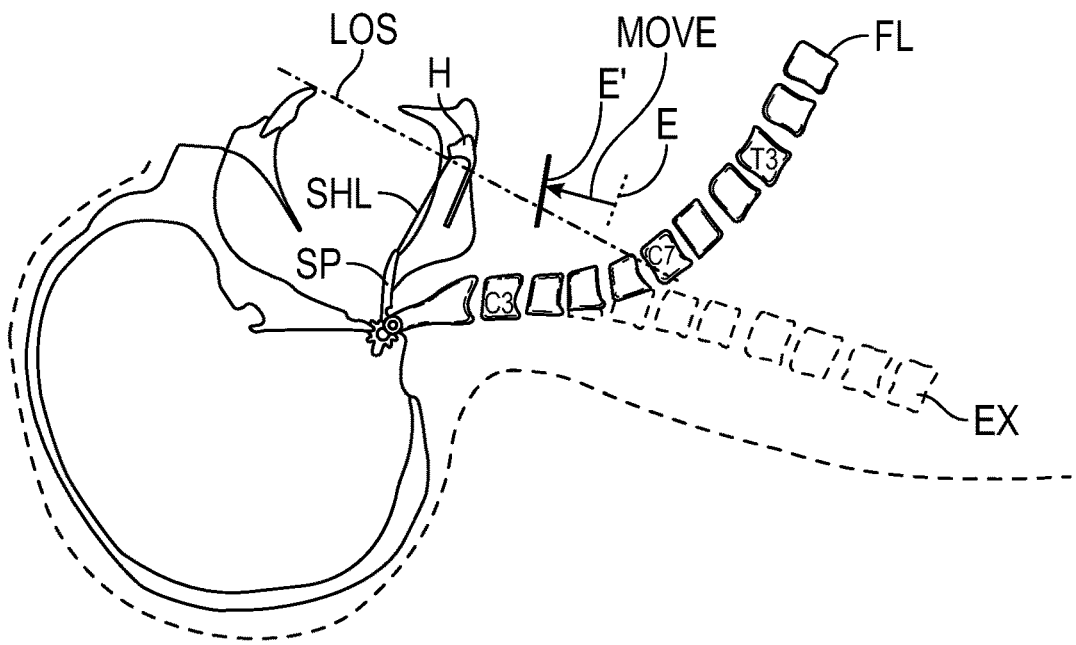

As shown in FIG. 8B, as the simulator SIM is moved from an extended position (EX) to a flexed position (FL), the epiglottis E and glottis G (FIG. 14B) move progressively toward the hyoid bone H, as indicated by arrow MOVE, exposing more of the glottis G within the line of sight LOS of the operator. That is, as the simulator SIM is moved from the extended position (EX) to the flexed position (FL), the epiglottis E and glottis G move incrementally from a first position (indicated as E in FIG. 8B) to a second position (indicated as E' in FIG. 8B) with flexion at each vertebral rotation center, resulting in an incremental moving of the line of sight LOS toward and up the epiglottis E and glottis G (FIG. 8B). Accordingly, an operator of the simulator SIM can continue to lift the head until glottis exposure is judged adequate for a simulated intubation.

Figure 9:
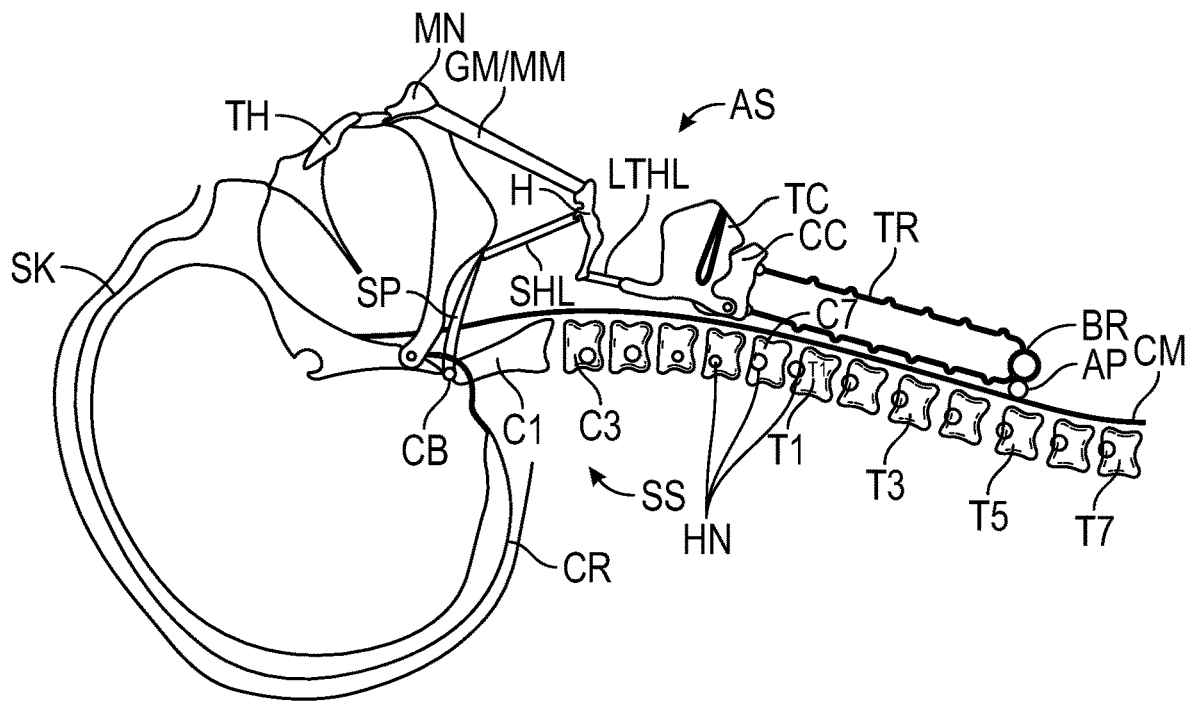
FIG. 9 is a side-view diagram of the training simulator of FIGS. 3A-8B in an extended position.
Figure 10:
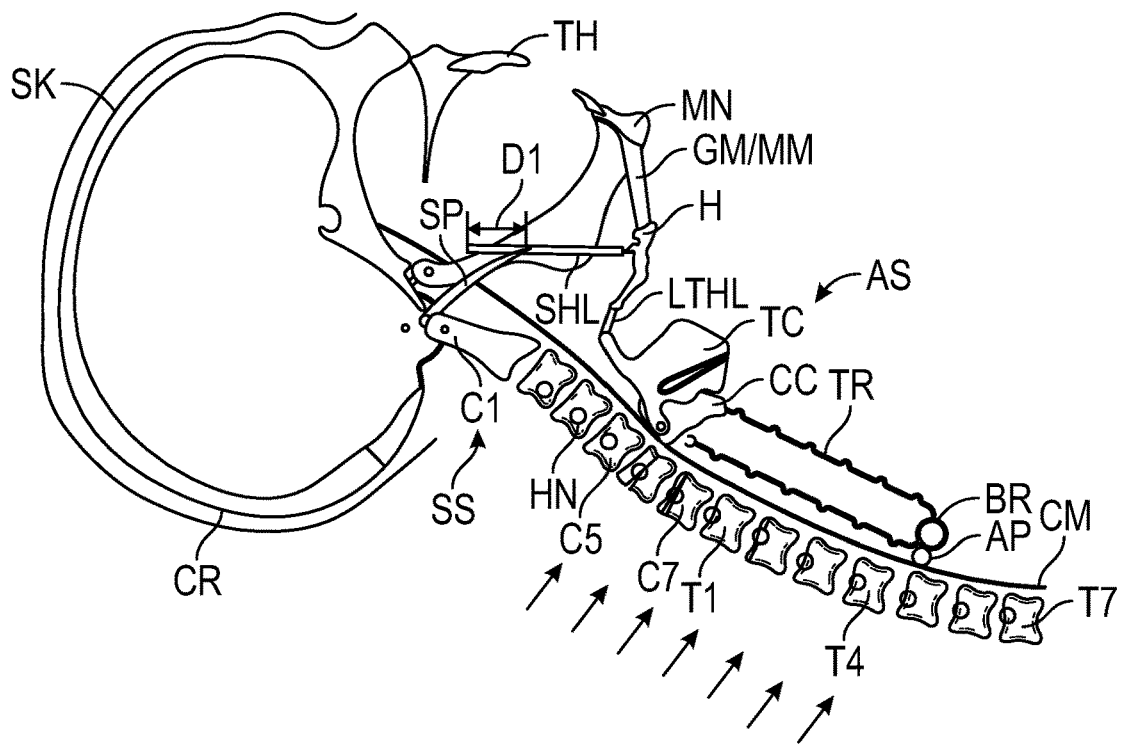
FIG. 10 is a side-view diagram of the training simulator of FIGS. 3A-9 in a flexed position.

Mechanism 2: Marked Easing of Glottis Exposure Due to Transfer of Hyoid Suspension Via Flexion of the Lower Portion of the Lordotic Arch Flexion at multiple adjacent vertebral rotation centers of the cervicothoracic vertebrae C1-T5 of the simulator SIM can have a greater impact to reduce axial tension when at the end of a spinal curve than toward the middle. As shown in FIGS. 9-10, which show the simulator SIM at approximately 35 degree head extension (e.g., from a neutral position) and a moderately flexed position, respectively, flexion at the cervical and thoracic vertebrae C5 or C6 through T3 or T4, can cause the head and upper cervical vertebrae of the simulator SIM to move forward from an extended position. As the simulator SIM is moved into a flexed position, the distance and axial tension between the styloid process SP and hilum BR can be reduced by a "gain" D1, via the "slack" gained in the airway skeleton AS, since the axial tension and length of the airway skeleton AS in an extended position (FIG. 9) is relatively greater than when in the flexed position (FIG. 10). In other words, flexion inverts the vertebral arch that causes axial tension in the airway skeleton AS formed when the head and neck of the simulator SIM are extended, thereby providing the "gain" D1 in length and slack of the airway skeleton AS when in flexion. This can occur with flexion at any of the seven rotation centers of the cervicothoracic vertebrae C5-T4 as indicated by the arrows in FIG. 10, but can be greater when more of these vertebrae are utilized, such as beyond the cervicothoracic vertebrae C5-T4.

Figure 11:
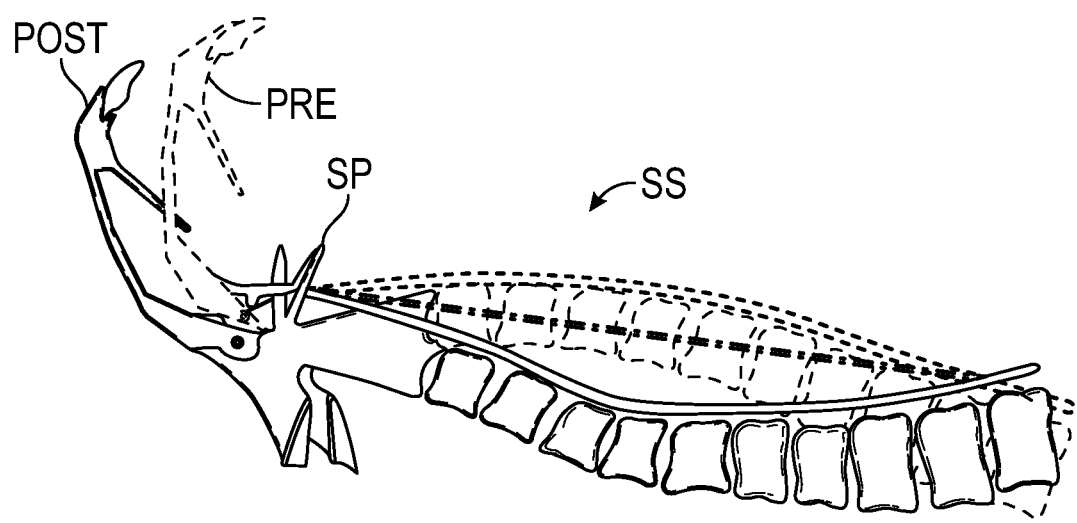
FIG. 11 is a side-view diagram of the somatic skeleton of FIGS. 3A-10 in extended and flexed positions, which are shown superimposed.

As shown in FIG. 11, the above-mentioned effect of flexion on the arch of the vertebrae somatic skeleton SS, causing the entire arch to invert, is made more apparent by superimposing the ends of the pre-flexion vertebrae PRE and post-flexion spines POST. For instance, the superimposed pre- and post-flexion vertebrae PRE, POST show that inversion of the arch due to flexion at one end further shortens the length the airway skeleton AS extends, i.e., from extending over the length of the arch in the pre-flexed position PRE, to a length situated more directly between the end points of the vertebrae in the post-flexed POST position. The result is a step-off drop in tension with slack length, such as by a gain D1, rather than an incremental change.

Flexion lower in the spine can also have a greater effect, casting forward everything above the flexion, i.e., the upper vertebrae, the skull SK, and mandible MN. The forward movement of the chin of the mandible MN can form a prominent vector on the hyoid bone H via the geniohyoid and mylohyoid muscles GM, MM toward the mandible MN. For example, as shown in FIGS. 9-10, in both the pre-flexed and flexed positions, the hyoid bone H is attached by both the stylohyoid ligaments SHL from the skull SK and the muscles from the mandible MN. However, the taut stylohyoid ligaments SHL in the extended configuration of FIG. 9 makes the more elastic muscles irrelevant to hyoid bone H position, whereas in the flexed configuration of FIG. 10, flexion makes the stylohyoid ligaments SHL "slack" (e.g., by gain D1) and the hyoid is pulled forward toward the mentum of the mandible MN via the geniohyoid and mylohyoid muscles GM, MM. This release from stylohyoid ligament SHL tension from behind the airway simultaneous with a vector to below the airway is the mechanism by which thrusting the head forward intrinsically eases glottis exposure by moving the hyoid bone H forward. The forward transfer of suspension has a pronounced effect on ease of glottis exposure but because the change is not appreciated, the dynamic of clinical exposure is typically missed.

Figure 12A:
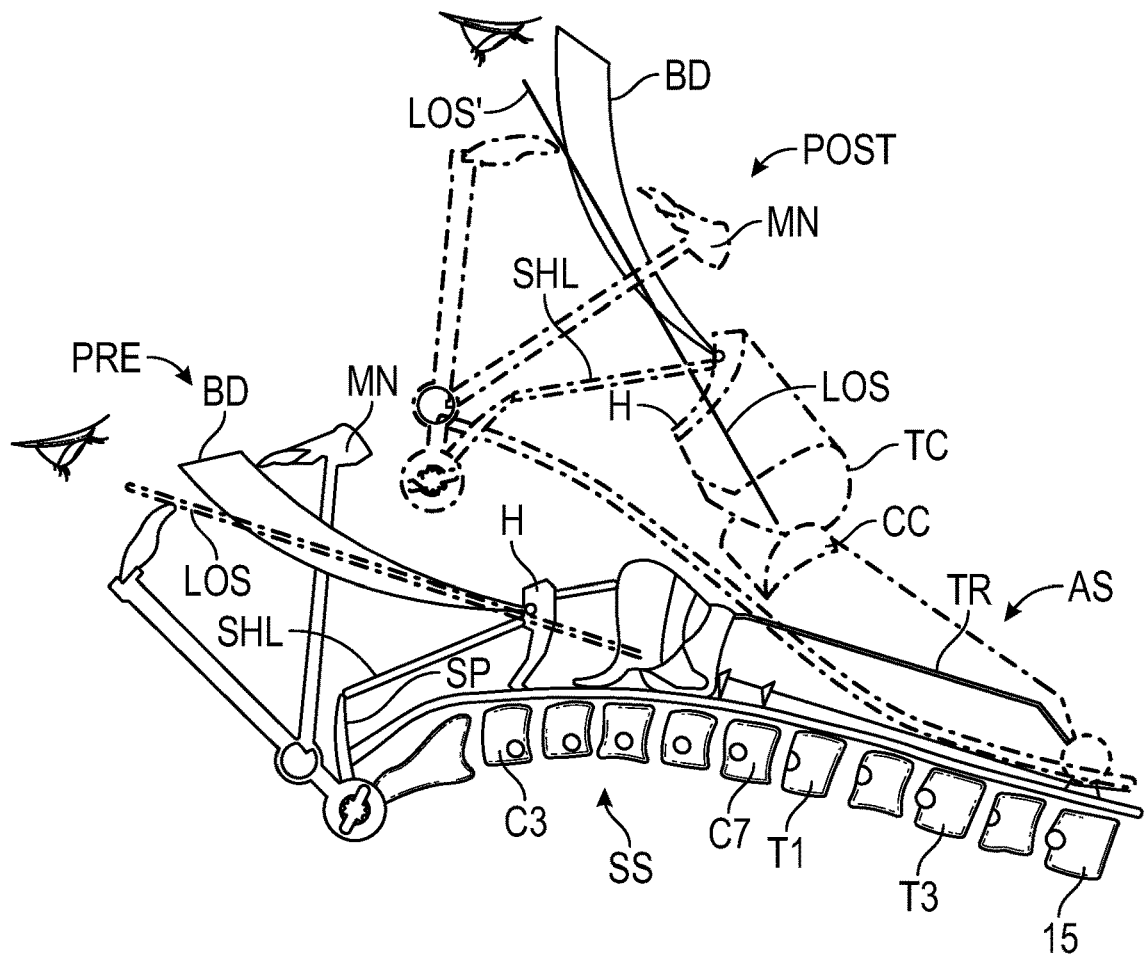
FIG. 12A is a side-view diagram illustrating a direct laryngoscopy procedure on the somatic and airway skeletons of the training simulator of FIGS. 3A-11 in both an extended position and a flexed position.
Figure 12B:
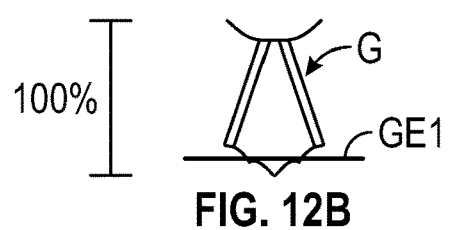
FIG. 12B is a schematic diagram illustrating a degree of glottic exposure achieved when the training simulator is in the extended position of FIG. 12A.
Figure 12C:
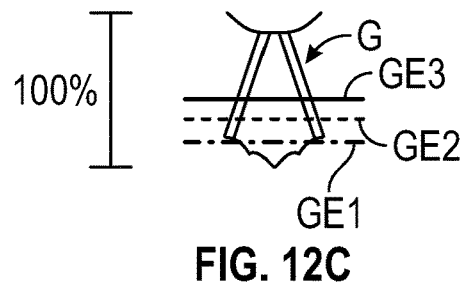
FIG. 12C is a schematic diagram illustrating further degrees of glottic exposure achieved when the training simulator is in the flexed position of FIG. 12A.

To illustrate, and as shown in FIGS. 12A-12C, the simulator SIM can be configured such that in a pre-flexed position PRE, the hyoid bone H can be difficult to lift, so glottis G exposure can be limited to about 10% based on the percentage of glottic opening-based system (POGO). This limited exposure of the glottis G is illustrated in FIG. 12B. In particular, FIG. 12B shows that the relatively small percentage of the glottis G exposed in the pre-flexed position PRE, is that portion of the glottis G viewed below the line GE1 and reflective of what an operator might see in a human patient. However, after the effects of head elevation and flexion to transfer the hyoid bone H forward in the post-flexed position POST, lift by the laryngoscope blade BD can lift the hyoid bone H with relatively greater ease and well forward of the spine but also tilt the thyroid cartilage TC forward such that the glottis exposure can be similar to the exposure shown in FIG. 12A, such as that of the line of sight LOS' in the post-flexed position POST. At that time, the thyroid cartilage TC of the simulator SIM can be pushed back toward the spine, to improve glottic exposure by pushing the glottis back into the line of sight LOS. In other words, when further head elevation and flexion transfers the airway skeleton AS suspension forward, the POGO may be improved, as shown by the glottic exposure lines GE2 and GE3, respectively, by external pressure pushing the glottis dorsally and then cephalad.

Mechanism 3: Easing of Glottis Exposure by Forward Tilt of Upper Airway Skeleton Relative to the Cricoid Cartilage As shown in FIG. 10, when the rotation centers of the upper and mid-cervical vertebrae C3-C7 of the simulator SIM are in flexion and positioned above and/or level with the upper airway skeleton AS (e.g., the region corresponding to the larynx), the styloid process SP and the skull SK are rotated forward while the cricoid cartilage CC remains relatively stationary. This rotation of the styloid process SP and skull SK can, in some examples, also rotate one or more of the simulator's SIM tissue surrogates forward relative to the cricoid cartilage CC. For instance, in some examples, the lateral cricothyroid ligaments LCTL of the simulator SIM can be structured as capsular ligaments, much like their native analogues, to serve as a hinge-like feature. The lateral cricothyroid ligaments LCTL can allow the thyroid cartilage TC and the surrogate tissues above the cricoid cartilage CC, such as the epiglottis E and tongue T, to rotate forward and bring the glottis G (FIG. 14B) forward relative to the cricoid cartilage CC. Since the hyoid bone H of the simulator SIM can be moved with relatively greater ease when the cervicothoracic vertebrae C1-T7 are in flexion, where the distance between the rotation centers and the tip of the styloid process SP is decreased, the hyoid bone H can move in front of the cricoid cartilage CC when the simulator SIM is in flexion. This allows the glottis to be seen from an anterior view and a simulated intubation can performed on the simulator SIM under direct vision of the entire or substantial portion of the glottis analogue.

Epiglottis and Glottis Exposure

As mentioned above, glottis exposure of the simulator SIM can be controlled primarily by the bilateral stylohyoid ligaments SHL, and the axial (or vertical) tension in the ligaments above and below the hyoid bone H, such as along the ligaments SHL, the thyrohyoid ligaments ATHL, LTHL and the cricothyroid ligaments ACTL, LCTL. The ligaments SHL can constrain the hyoid bone H to an arc centered at the tips of the styloid processes SP, where the radius of the arc is equal to or approximately equal to the length of the ligaments SHL. Axial tension in the ligaments above and below the hyoid bone H can limit hyoid movement along the arc defined by the ligaments SHL. The ligaments SHL from above and behind the hyoid bone H can draw the hyoid back and to the cervical vertebrae when the skull SK and/or the spinal column are extended. Extension can also establish tension in the chains of thyrohyoid and cricothyroid ligaments that suspend the airway skeleton AS.

The front of the hyoid bone H can be secured by a thick, elastic cord (e.g., the geniohyoid muscle GM) to the inside surface of the center of the mandible MN. The anterior elastic cord can have no effect on hyoid bone H position when the ligaments SHL from behind are taut but can be configured to pull the hyoid bone H forward toward the center of the mandible MN when the ligament SHL from behind and above the hyoid bone H forms "slack," such as through the second mechanism described herein. As mentioned above, via the first and second mechanisms, this slack in the ligament SHL can occur incrementally with progressive flexion of the cervical spine, or more abruptly with flexion of the upper thoracic and lower cervical spine. In addition, ease of glottis exposure can be achieved via the third mechanism, where tilt of upper airway skeleton relative to the cricoid cartilage CC can bring the glottis forward. As such, the fundamental transfer of suspension of the hyoid bone H from above and behind, to below and in front of the airway can be achieved by and observed in the simulator SIM via the first, second, and third mechanisms for easing glottis exposure.

In some examples, the posterior of the hyoid bone is connected by a thin elastic web of the mylohyoid muscle (e.g., cords or wires) to the anterior surface of the mandible about halfway between the alveolar ridge in the center front, and above the midlevel of the interior wall of the mandible MN as it progresses back to where posterior molar teeth commonly reside. This arrangement can allow the hyoid bone H to be suspended in a plane parallel and midway between the mandible MN and thyroid cartilage TC in the neutral position and also as the head or skull SK is extended. The hyoid bone H can also be lifted behind the mandible when the head is neutral of a flexed position, or when the skull SK is held forward, the mandible MN can be rotated forward to bring the hyoid bone H to the level of the alveolar ridge, which enlarges the space for lateral displacement.

The tongue of the human anatomy is comprised largely of a complex muscle (i.e., the genioglossus muscle GM), which is capable of complex movement but is relaxed under anesthesia. Accordingly, the tongue T of the simulator SIM (e.g., FIG. 4A) can be a constructed of a globular mass rooted in and which projects back and up from the anterior mandible MN to fill the entire or a portion of the oral cavity formed by the skull SK and mandible MN. The tongue T can be shaped by a thin wall of elastic casting in the oral cavity, splinted by a three-dimensional web of plastic fibers, and filled with viscous fluid that is easily displaced but returns to its original shape. As such, the shape and structure of the tongue T of the simulator SIM can be similar to the shape and structure of the tongue of the human anatomy, to simulate its displacement characteristics during operation.

The superior surface of the tongue T can continue down from the "soft palette" and be secured to the superior surface of the hyoid bone H, for example, as shown in FIG. 13, which shows a diagram of the tongue T, hyoid bone H, and epiglottis E of the simulator SIM, respectively. As shown in FIG. 13, which shows the tongue T held forward with the laryngoscope blade BD, the dorsal and inferior tongue can be connected to the hyoid bone H, which can have legs extending dorsally to the spine. FIG. 13 also shows the epiglottis E as it projects from the thyroid cartilage TC and suspended midline by a triangular web of surrogate ligaments.

The epiglottis E of the simulator SIM can be flat, oval, and leaf-like in shape, with a long stem that projects from inside the front of the thyroid cartilage TC, just above the anterior commissure of where the vocal cords are generally located in a human patient. The epiglottis can be structured in variety of different ways. The epiglottis E can be suspended from the hyoid bone H by a thin midline web of ligaments, i.e., the hyoepiglottic ligament HEL, that normally maintain the epiglottis E close to the caudal dorsum (i.e., lower back) of the tongue T when the mandible MN is closed, such as shown in FIG. 13.

Referring to FIGS. 14A-14B, the epiglottis E, hyoid bone H, and tongue T of the simulator SIM can be configured such that the epiglottis E responds to a laryngoscope blade BD in the same or similar manner as a native epiglottis does in a human patient. For example, if the skull SK of the simulator SIM is elevated enough, as the tongue T is lifted forward, the blade BD tip can approach the suspending hyoepiglottic ligament HEL, e.g., at approximately a right angle or other angle, to cause the epiglottis E to flip up and out of sight against the blade BD. This movement of the epiglottis E is best shown in FIG. 14B, showing the epiglottis fully exposing a glottis G of the simulator SIM in the right most image. In some examples, the epiglottis E can be configured to be relatively unresponsive when the blade BD applies pressure laterally relative to the hyoepiglottic ligament HEL and/or can buckle, hiding the glottis G, when the blade BD contacts the mid-point of the hyoepiglottic ligament HEL. In a like manner, the tongue T, hyoid bone H, and epiglottis E can be configured such that suboptimal positioning of the blade BD alters the response of the epiglottis E to the blade pressure. For instance, the epiglottis E of the simulator SIM can respond differently depending on blade BD positioning and pressure, such as when the blade BD is in contact against the hyoid bone H, or in the vallecula, or past the hyoid bone H, in a pear drop position, and/or in contact with the epiglottis E. As illustrated in FIG. 14B, a glottis G of the simulator SIM can be coupled or otherwise integrated with the epiglottis E, such that the glottis G can be included in any of the examples of the simulator SIM described herein. In some examples, the structure forming the glottis G can include pliable tissue surrogates that can impede views of the glottis or placement of an intubation tube and/or include a subglottic region, such as to provide a simulated surgical airway.

General Considerations

For purposes of this description, certain aspects, advantages, and novel features of the examples of this disclosure are described herein. The disclosed methods, apparatus, and systems should not be construed as being limiting in any way. Instead, the present disclosure is directed toward all novel and nonobvious features and aspects of the various disclosed examples, alone in various combinations and sub-combinations with one another. The methods, apparatus, and systems are not limited to any specific aspect or feature or combination thereof, nor do the disclosed examples require that any one or more specific advantages be present or problems be solved. The technologies from any example can be combined with the technologies described in any one or more of the other examples.

Although the operations of some of the disclosed examples are described in a particular sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "connected" generally mean electrically, electromagnetically, and/or physically (e.g., mechanically or chemically) coupled or linked and do not exclude the presence of intermediate elements between the coupled or associated items absent specific contrary language.

Directions and other relative references (e.g., inner, outer, upper, lower, etc.) may be used to facilitate discussion of the drawings and principles herein, but are not intended to be limiting. For example, certain terms may be used such as "inside," "outside," "top," "down," "interior," "exterior," and the like. Such terms are used, where applicable, to provide some clarity of description when dealing with relative relationships, particularly with respect to the illustrated examples. Such terms are not, however, intended to imply absolute relationships, positions, and/or orientations. For example, with respect to an object, an "upper" part can become a "lower" part simply by turning the object over. Nevertheless, it is still the same part and the object remains the same. As used herein, "and/or" means "and" or "or," as well as "and" and "or."

In view of the many possible ways in which the principles of the disclosure may be applied, it should be recognized that the illustrated configurations depict examples of the disclosed technology and should not be taken as limiting the scope of the disclosure nor the claims. Rather, the scope of the claimed subject matter is defined by the following claims and their equivalents.

The invention claimed is:

1. A laryngoscopy training simulator comprising:
a somatic skeleton comprising a skull portion and a spine portion coupled to the skull portion, the skull portion having a styloid process and a mandible and the spine portion having a plurality of vertebra arranged in a column, wherein the skull portion and the spine portion are configured to curve between an extended position and a flexed position; and
an airway skeleton comprising a hyoid bone, a first ligament coupling the hyoid bone to the styloid process of the skull portion, and a second ligament coupling the hyoid bone to the mandible of the skull portion;
wherein when the skull and spine portions are in the extended position, the first ligament is under tension and draws the hyoid bone in a first direction and when the skull and spine portions are in the flexed position, the second ligament is under tension and draws the hyoid bone in a second direction;
wherein the training simulator is configured to simulate hyoid bone movement relative to the spine and skull portions in a similar manner as the human anatomy.

2. The training simulator of claim 1, further comprising a ligament assembly coupling the hyoid bone to an anchor point of the spine portion, wherein the styloid process is coupled to a first end of the spine portion and the anchor point is located at a second end of the spine portion opposite the styloid process.

3. The training simulator of claim 2, wherein the first ligament and the ligament assembly are tensioned between the styloid process and the anchor point when the skull and spine portions are in the extended position.

4. The training simulator of claim 1, wherein the first ligament is tensioned when the skull and spine portions are in the extended position and is slackened when the skull and spine portions are in the flexed position.

5. The training simulator of claim 1, wherein each pair of adjacent vertebrae of the spine portion are coupled to one another by a hinge, each hinge forming a rotation center in which a respective pair of adjacent vertebrae move relative to each other.

6. The training simulator of claim 2, wherein the hyoid bone is situated between the styloid process and the anchor point.

7. The training simulator of claim 2, further comprising an epiglottis structure and a glottis structure coupled to the hyoid bone and/or the ligament assembly, wherein the epiglottis and glottis structures are visible to an operator of the training simulator via an opening defined between the mandible and the spine of the somatic skeleton.

8. The training simulator of claim 7, wherein the visibility of the epiglottis and glottis structures is greater when the skull and spine portions are in the flexed position and the hyoid bone is drawn in the second direction by the second ligament, than when the skull and spine portions are in the extended position and the hyoid bone is drawn in the first direction by the first ligament.

9. The training simulator of claim 7, further comprising a blade sized and shaped to extend through the opening defined between the mandible and the spine of the somatic skeleton and apply pressure to the epiglottis structure and/or the hyoid bone.

10. The training simulator of claim 9, wherein the epiglottis structure is configured to move in a direction toward the hyoid bone when the blade applies pressure to one or more points along a surface of the epiglottis.

11. The training simulator of claim 1, wherein the hyoid bone is configured to move toward and away from the spine portion of the somatic skeleton, wherein the movement of the hyoid bone when the skull and spine portions are in an extended position is restricted relative to the movement of the hyoid bone when the skull and spine portions are in the flexed position.

12. The training simulator of claim 11, wherein the hyoid bone is configured to move outwardly from the spine portion when the blade applies pressure to the hyoid bone.

13. The training simulator claim 1, further comprising a tongue portion coupled to the hyoid bone and situated within an opening defined by the mandible and spine portion.

14. The training simulator of claim 5, the spine portion further comprising a plurality of fixing members, each fixing member configured to fix the relative angle between respective pairs of adjacent vertebrae.

15. The training simulator of claim 1, wherein each vertebra of the spine portion is configured to have a respective maximum degree of extension and a respective maximum degree of flexion relative to a neutral position.

16. The training simulator of claim 1, wherein the mandible comprises one or more incisors, cuspids, molars, or a combination thereof.

17. The training simulator of claim 1, the skull portion further comprising a maxilla bone, the maxilla bone comprising one or more incisors, cuspids, molars, or a combination thereof.

18. The training simulator of claim 1, wherein the mandible is configured to project outwardly relative to the styloid process.

19. The training simulator of claim 1, wherein the first ligament, the second ligament, and at least one ligament of the ligament assembly comprises one or more elastic cables, cords, wires, chains, and/or tissue surrogate.

20. The training simulator of claim 16, wherein one or more incisors, cuspids, or molars comprise an optical device.

21. The training simulator of claim 9, wherein the blade comprises a torque transducer.

22. The training simulator of claim 1, wherein the hyoid bone comprises a pressure sensor along its surface.

23. The training simulator of claim 9, wherein the blade comprises a sensor configured to measure a force acting on the blade.

24. The training simulator of claim 7, wherein the epiglottis structure comprises a touch sensor.

25. A laryngoscopy training simulator, comprising:
a skeleton structure comprising a styloid process analogue, a mandible analogue, and a longitudinally extending column having a first end and a second end, wherein the styloid process analogue and the mandible analogue are coupled to and extend outwardly from the first end of the column and the column is configured to move between an extended state and a flexed state between the first and second ends;
a suspension chain extending parallel to the column and configured to move with the column between the extended state and flexed state, the suspension chain comprising a hyoid analogue, a first elastic member coupling the hyoid analogue to the styloid process analogue, a second elastic member coupling the hyoid analogue to the mandible analogue, and a third elastic member coupling the hyoid analogue to an anchor point situated at the second end of the column of the skeleton structure; and
a glottic analogue coupled to the hyoid analogue, wherein the glottic analogue is visible via a first opening defined between the mandible analogue and the first end of the column, and a second opening defined between the hyoid analogue and a longitudinally extending edge of the column;
wherein when the column is in an extended state, the first and third elastic members are under tension and draw the hyoid analogue in a first direction toward the column, and wherein when the column is in a flexed state, the second elastic member is under tension and draws the hyoid analogue in a second direction toward the mandible analogue;
wherein the visibility of the glottic analogue via the first and second openings is greater when the column is in a flexed state and the hyoid analogue is drawn in the second direction by the second elastic member, than when the column is in an extended state and the hyoid analogue is drawn in the first direction by the first and third elastic members.

* * * * *